US011638128B2

(12) United States Patent
Greaves et al.

(10) Patent No.: US 11,638,128 B2
(45) Date of Patent: Apr. 25, 2023

(54) PERSONALIZED MANAGEMENT OF CONNECTED DEVICES

(71) Applicant: AT&T Mobility II LLC, Atlanta, GA (US)

(72) Inventors: Brian Greaves, Atlanta, GA (US); Stephen Thomas Hardin, Atlanta, GA (US); Erie Lai Har Lau, Redmond, WA (US); Robert Osterwise, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 7 days.

(21) Appl. No.: 17/155,822

(22) Filed: Jan. 22, 2021

(65) Prior Publication Data
US 2021/0144523 A1 May 13, 2021

Related U.S. Application Data

(63) Continuation of application No. 16/245,282, filed on Jan. 11, 2019, now Pat. No. 10,932,099, which is a continuation of application No. 14/941,544, filed on Nov. 14, 2015, now Pat. No. 10,219,126.

(51) Int. Cl.
*H04M 3/00* (2006.01)
*H04W 4/21* (2018.01)
(52) U.S. Cl.
CPC .................................. *H04W 4/21* (2018.02)
(58) Field of Classification Search
CPC combination set(s) only.
See application file for complete search history.

(56) References Cited

U.S. PATENT DOCUMENTS

| | | | |
|---|---|---|---|
| 7,287,062 B2 | 10/2007 | Im et al. | |
| 8,103,744 B2 | 1/2012 | Yoshihara et al. | |
| 8,335,842 B2 | 12/2012 | Raji et al. | |
| 9,021,139 B1* | 4/2015 | Kim ................... | H04W 12/065 709/250 |
| 2005/0125540 A1 | 6/2005 | Szu et al. | |
| 2007/0183345 A1 | 8/2007 | Fahim et al. | |
| 2007/0268121 A1 | 11/2007 | Vasefi et al. | |
| 2009/0076726 A1* | 3/2009 | Gemignani, Jr. .... | G01C 23/005 715/702 |

(Continued)

FOREIGN PATENT DOCUMENTS

| | | |
|---|---|---|
| CN | 104283967 B | 7/2018 |
| WO | 2012152513 A2 | 11/2012 |

OTHER PUBLICATIONS

Wueest, Candid , "Is IoT in the Smart Home giving away the keys to your kingdom?", http://www.symantec.com/connect/blogs/iot-smart-home-giving-away-keys-your-kingdom, Mar. 12, 2015, 6 pages.

*Primary Examiner* — Justin Y Lee
(74) *Attorney, Agent, or Firm* — Guntin & Gust, PLC; Matthew Tropper

(57) ABSTRACT

Centralized management of the Internet of Things resolves user difficulties. Connected devices may be associated with an owner's or user's electronic profile. The electronic profile may be represented as a graphical user interface (such as a webpage), thus allowing remote management of the connected devices. The owner or user may thus configure the electronic profile to define what electronic data is shared and with whom.

20 Claims, 27 Drawing Sheets

(56) References Cited

U.S. PATENT DOCUMENTS

| | | | |
|---|---|---|---|
| 2012/0297201 A1* | 11/2012 | Matsuda | H04L 9/3073 |
| | | | 713/189 |
| 2013/0331073 A1 | 12/2013 | Balan et al. | |
| 2014/0081433 A1 | 3/2014 | Cheong et al. | |
| 2014/0208247 A1 | 7/2014 | Dayan | |
| 2014/0244768 A1 | 8/2014 | Shuman et al. | |
| 2015/0019553 A1 | 1/2015 | Shaashua et al. | |
| 2015/0019714 A1 | 1/2015 | Shaashua et al. | |
| 2015/0113172 A1 | 4/2015 | Johnson et al. | |
| 2015/0143462 A1 | 5/2015 | Li | |
| 2015/0201022 A1 | 7/2015 | Kim et al. | |
| 2015/0222711 A1 | 8/2015 | Huo et al. | |
| 2017/0126577 A1* | 5/2017 | Sender | H04W 8/18 |

* cited by examiner

PERSONALIZED MANAGEMENT OF CONNECTED DEVICES

CROSS-REFERENCE TO RELATED APPLICATION

This application is a continuation of U.S. patent application Ser. No. 16/245,282 filed on Jan. 11, 2019, which is a continuation of U.S. patent application Ser. No. 14/941,544 (now U.S. Pat. No. 10,219,126), filed on Nov. 14, 2015. The contents of each of the foregoing is/are hereby incorporated by reference into this application as if set forth herein in full.

BACKGROUND

The "Internet of Things" will be challenging. As more and more devices connect to communications networks, most users will struggle to understand which of their connected devices shares data with whom.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
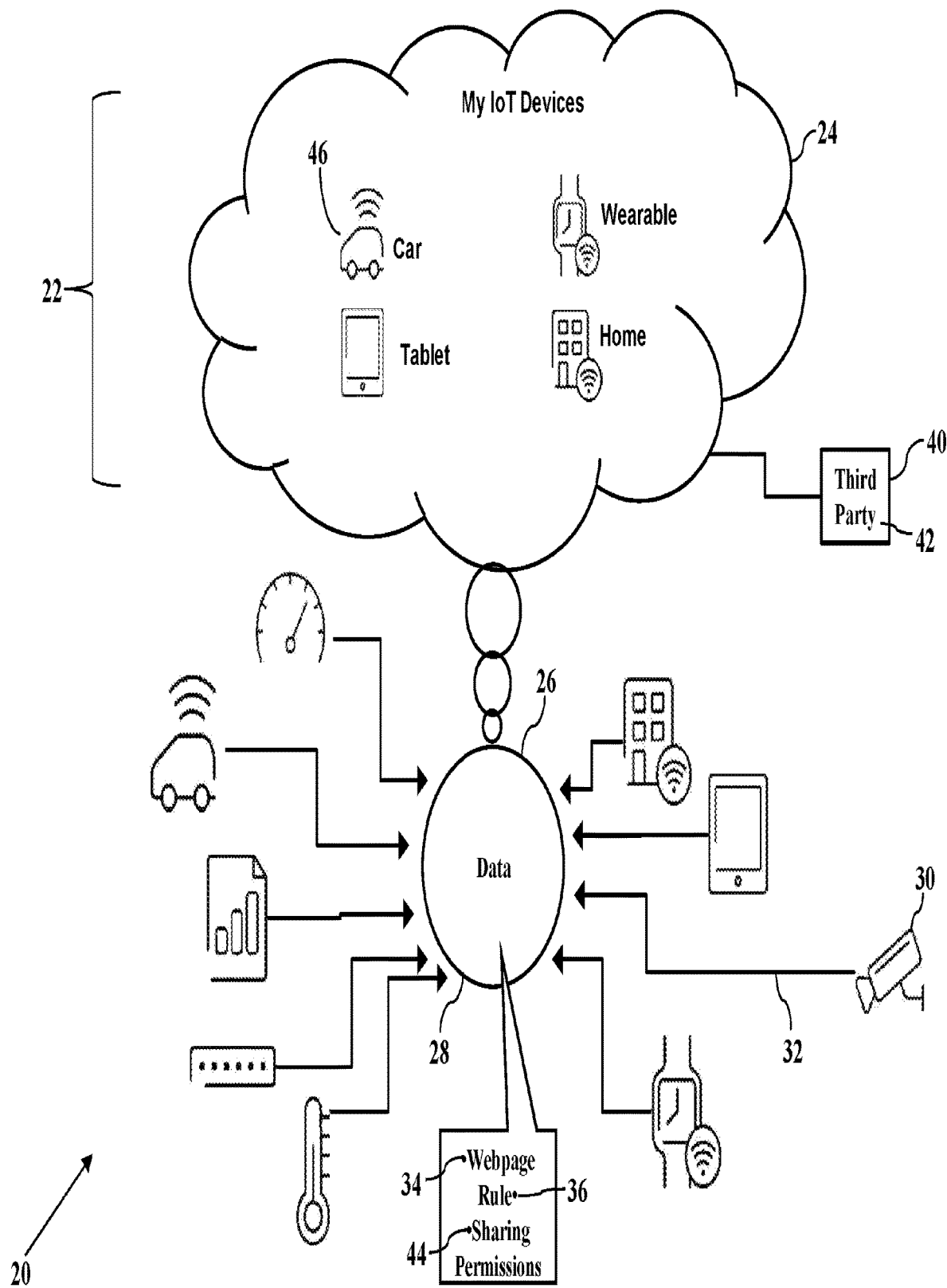
FIGS. 1-8 are simplified illustrations of an environment in which exemplary embodiments may be implemented.

FIGS. 1-8 are simplified illustrations of an environment in which exemplary embodiments may be implemented. FIG. 1 illustrates a virtual platform 20 for centralized management of connected devices 22. That is, each one of the devices 22 is capable of connecting to a communications network 24. Each one of the devices 22 is thus capable of collecting some type of data 26 and reporting the data 26 to a destination (such as a service provider, social network, or other third party, as later paragraphs will explain). Exemplary embodiments implement a central portal 28 that allows a user to manage what data 26 is collected and what data 26 is shared. The central portal 28 is thus a convenient tool for picking and choosing the user's "Internet of Things" and how each connected device 22 shares the data 26 it collects.

FIG. 1, for example, illustrates a digital video camera 30. As the reader likely understands, the digital video camera 30 captures video data 32. Ordinarily the video data 32 would then be sent to some network address (such as a server or website URL) for analysis. Here, though, the central portal 28 allows the user to specify when and where the video data 32 is reported. Suppose that the central portal 28 is implemented as a webpage 34. The webpage 34 may have data fields allowing the user to define one or more logical rules 36 related to the video data 32. One such rule 36 may define a third party 40 that is permitted access to the video data 32. For example, the user may permit the video data 32 to be sent to a network address associated with a server or application that provides a security service 42. However, the video data 32 may be prohibited from third party social networking sites (such as FACEBOOK® or INSTA- GRAM®). The user, in other words, may specify (via the central portal 28) network addresses, uniform resource locators, services, and/or applications that are permitted, or prohibited from, receiving or using the video data 32. The central portal 28, in simple words, allows the user to define sharing permissions 44 associated with the video data 32.

FIG. 1 also illustrates a connected vehicle 46. As the reader again likely understands, many cars and trucks collect a vast amount of sensory data 26 that can be shared with many entities (such as a manufacturer, network provider, dealer, and even other vehicles). Here, then, the central portal 28 allows the user to specify when and where the sensory data 26 is reported. The user, for example, may specify a dealer's email or other network address for receiving error codes and other diagnostic sensory data 26. However, the user may strictly prohibit sharing of location, speed, and other sensitive data 26. The central portal 28 allows the user to define the sharing permissions 44 associated with the sensory data 26 collected by the user's connected vehicle 46.

Exemplary embodiments thus allow centralized management of the user's Internet of Things. As more and more of our devices 22 connect to the Internet, the amount of data 26 grows. Indeed, we will each soon have many devices 22 collecting and potentially transmitting the data 26 regarding location, profile, preferences, habits, and activities. Much of this data 26 is coveted by service providers (such as GOOGLE®, FACEBOOK®, AMAZON®, and other marketers and retailers). The central portal 28 thus provides a tool for managing our Internet of Things. Users may centrally manage their connected devices 22, perhaps even past, current, and future data 26 that is being collected, stored, and shared with others.

Figure 2:
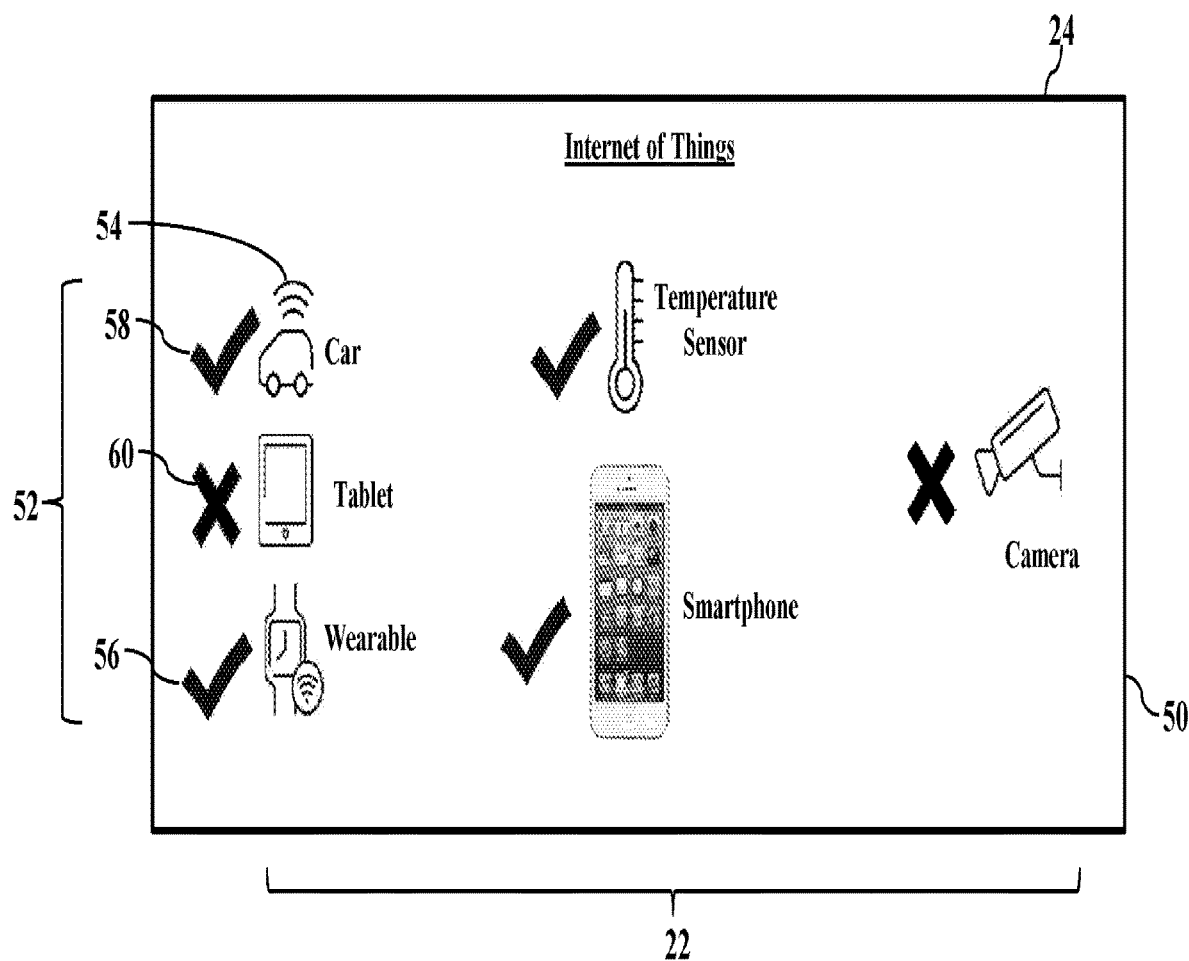

FIG. 2 illustrates device network connectivity. Because the user may have many different connected devices 22, the central portal 28 allows convenient selection of the user's Internet of Things. FIG. 2, for example, illustrates the central portal 28 as a graphical interface 50 having graphical controls 52. Each connected device 22 may be graphically represented with a corresponding device icon 54. The user may merely select a particular device icon 54 to easily change its connection status 56. For example, a checkmark 58 may indicate the corresponding device 22 is online and thus ready to report or share its associated data (illustrated as reference numeral 26 in FIG. 1). A "no" symbol 60, though, may indicate the corresponding device 22 is offline and not sending its data 26 into the communication network (illustrated as reference numeral 24 in FIG. 1). Simple graphical controls 52 may thus be used to manage which devices 22 are online.

Figure 3:
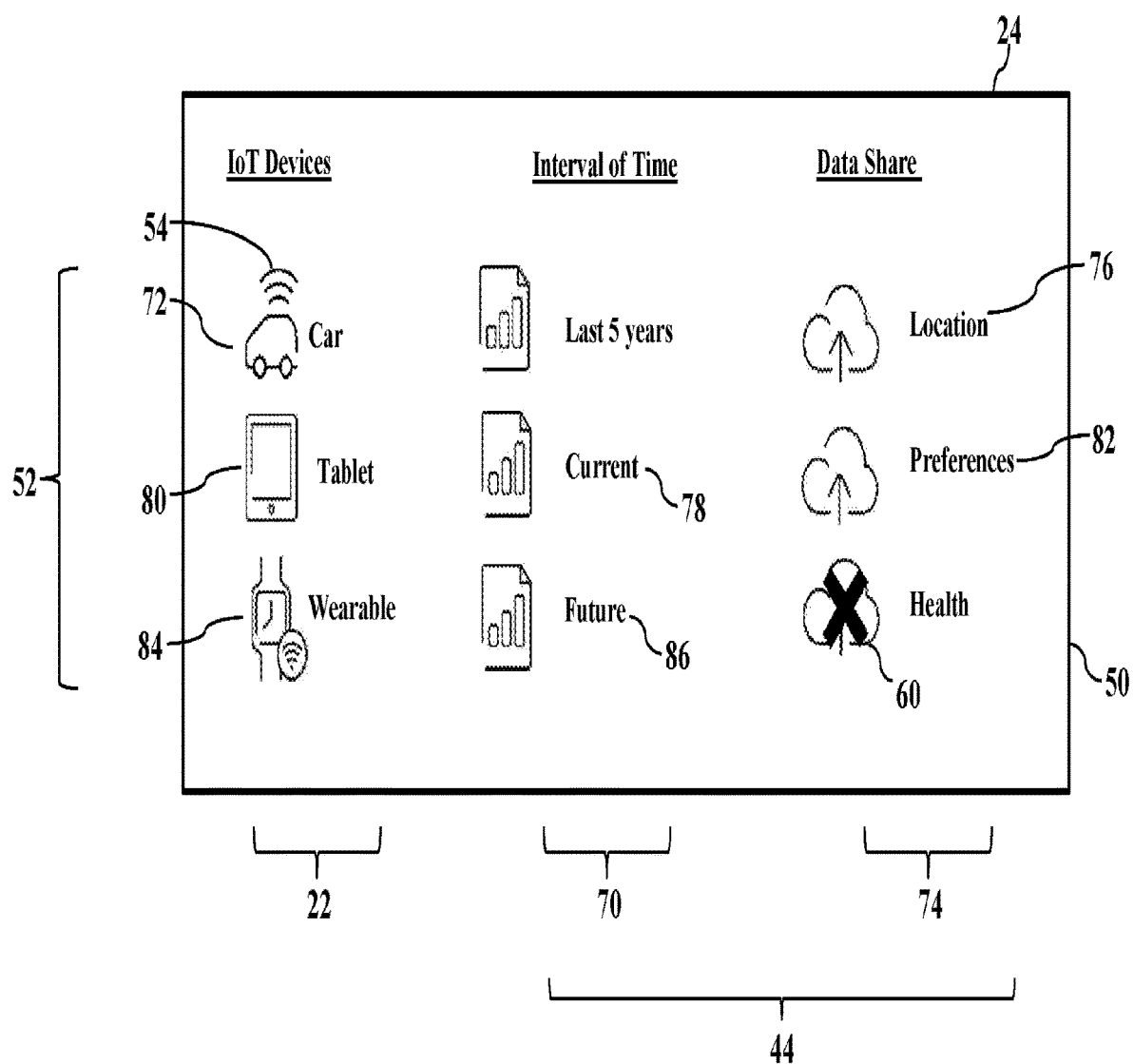

FIG. 3 illustrates the sharing permissions 44. Here again the central portal 28 is illustrated as the graphical interface 50 for defining the sharing permissions 44 associated with the sensory data (illustrated as reference numeral 26 in FIG. 1) collected by the user's connected devices 22. Each connected device 22 may again be graphically represented with its corresponding device icon 54. Here, though, the data 26 collected by each device 22 may be associated with an interval 70 of time. The interval 70 of time defines a time-based availability of the associated data 26 generated by the corresponding device 22. For example, the data 26 generated by the user's connected vehicle (represented by a vehicular icon 72) is historically available for five (5) years. That is, the central portal 28 allows the user to approve use, retention, and/or archiving of the data 26 (generated by the user's connected vehicle) for five (5) years. After the interval 70 of time expires, any older data 26 (perhaps determined from timestamps) is unavailable. The interval 70 of time may thus bind a third party service provider to permissible time-based restrictions on the data 26.

FIG. 3 also illustrates a data share 74. Even though the data 26 may be sharable (perhaps as determined by the interval 70 of time), the user may also define permissible uses for the data 26. That is, the central portal 28 may also allow the user to define how the data 26 is used. For example, the data 26 generated by the user's connected vehicle (again represented by the vehicular icon 72) may only be used for location 76 purposes. Again, even though the user's connected vehicle collects a vast amount of the sensory data 26, here the user only permits using that data 26 for determining the geographical location 76 associated with the vehicle. Any data share 74 not related to or associated with locational determination may thus be impermissible. The data share 74 may thus restrict any third party service provider to permissible parameters for using the data 26.

FIG. 3 illustrates other options. For example, the user may define the interval 70 of time to specify only a contemporaneous or current setting 78. That is, the current setting 78 only permits the use of the data 26 most recently generated by the corresponding connected device 22. Suppose the user has a connected tablet computer (represented by a tablet icon 80). The user may configure the interval 70 of time to indicate that only the most recent data 26 generated by the tablet is sharable. Older, historical data 26 is thus unavailable for sharing. Moreover, the user has also specified that the current data 26 (generated by the tablet computer) has the data share 74 restricted to a preference setting 82. In other words, only the current data 26 generated by the tablet computer may be permissibly used for determining other content preferences that may appeal to the user. Historical profiling may thus be unavailable and/or impermissible. Conversely, the data 26 generated by the user's wearable device (represented by a wearable icon 84) is only available at a future time 86 and may not be used for health 88 purposes (as indicated by the "no" symbol 60). That is, the data 26 generated by the wearable device may not be used to determine the user's pulse, blood pressure, or perhaps even activity. The central portal 28 may thus permit centralized restriction of the data share 74, as later paragraphs will explain. Exemplary embodiments thus include a graphical tool for managing our Internet of Things, including past, current, and future data 26 that is being collected, stored, and shared with others.

Figure 4:
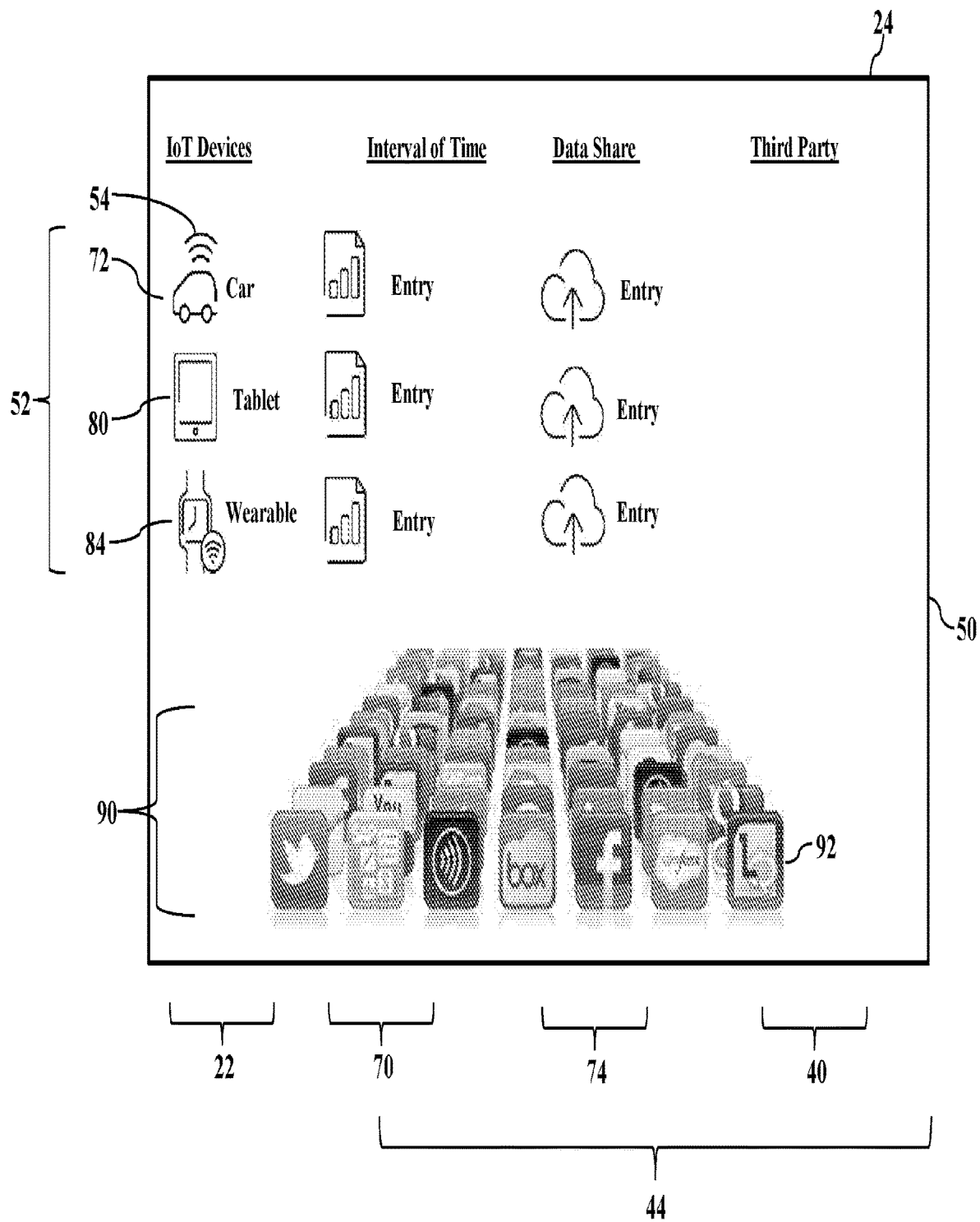
Figure 5:
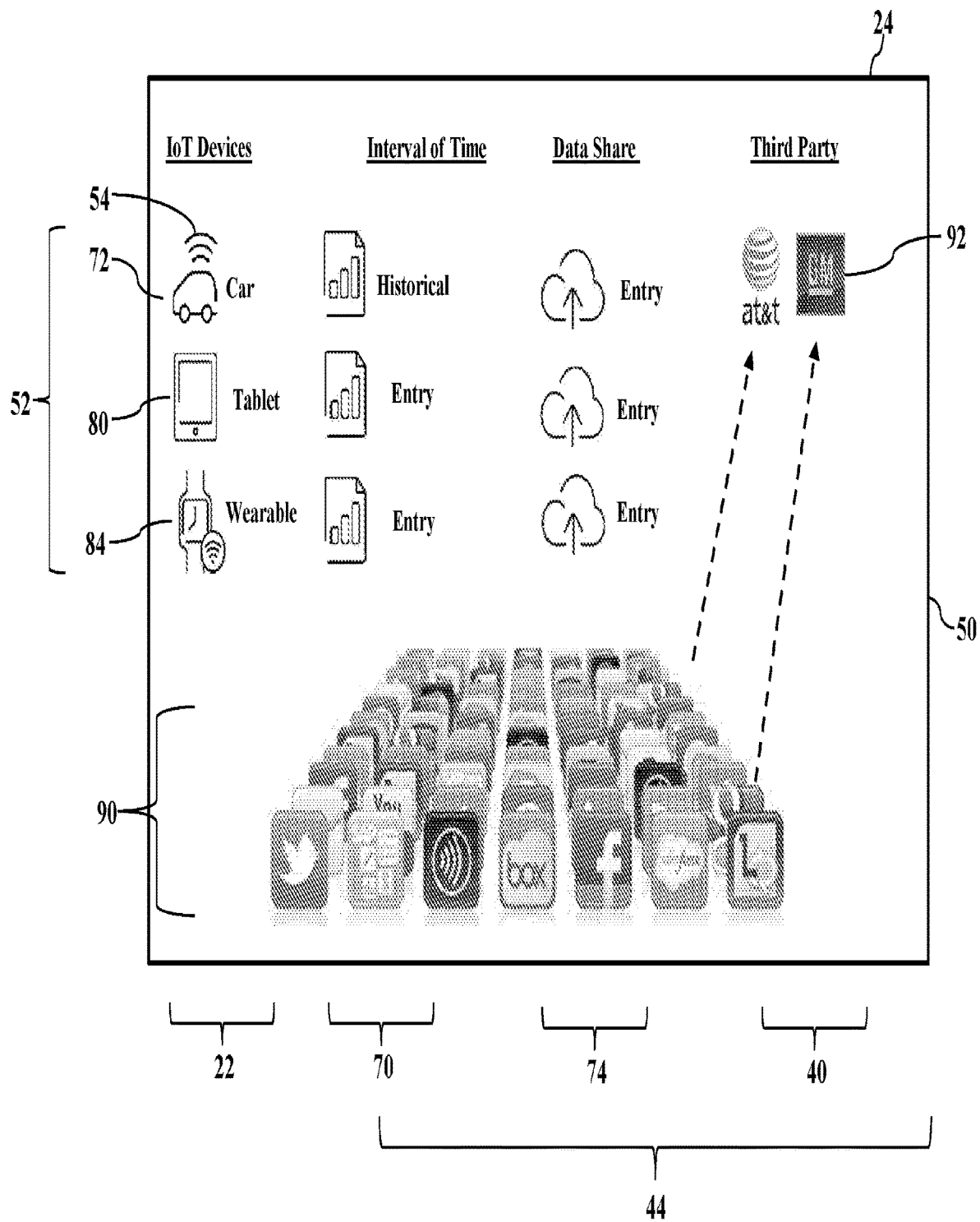
Figure 6:
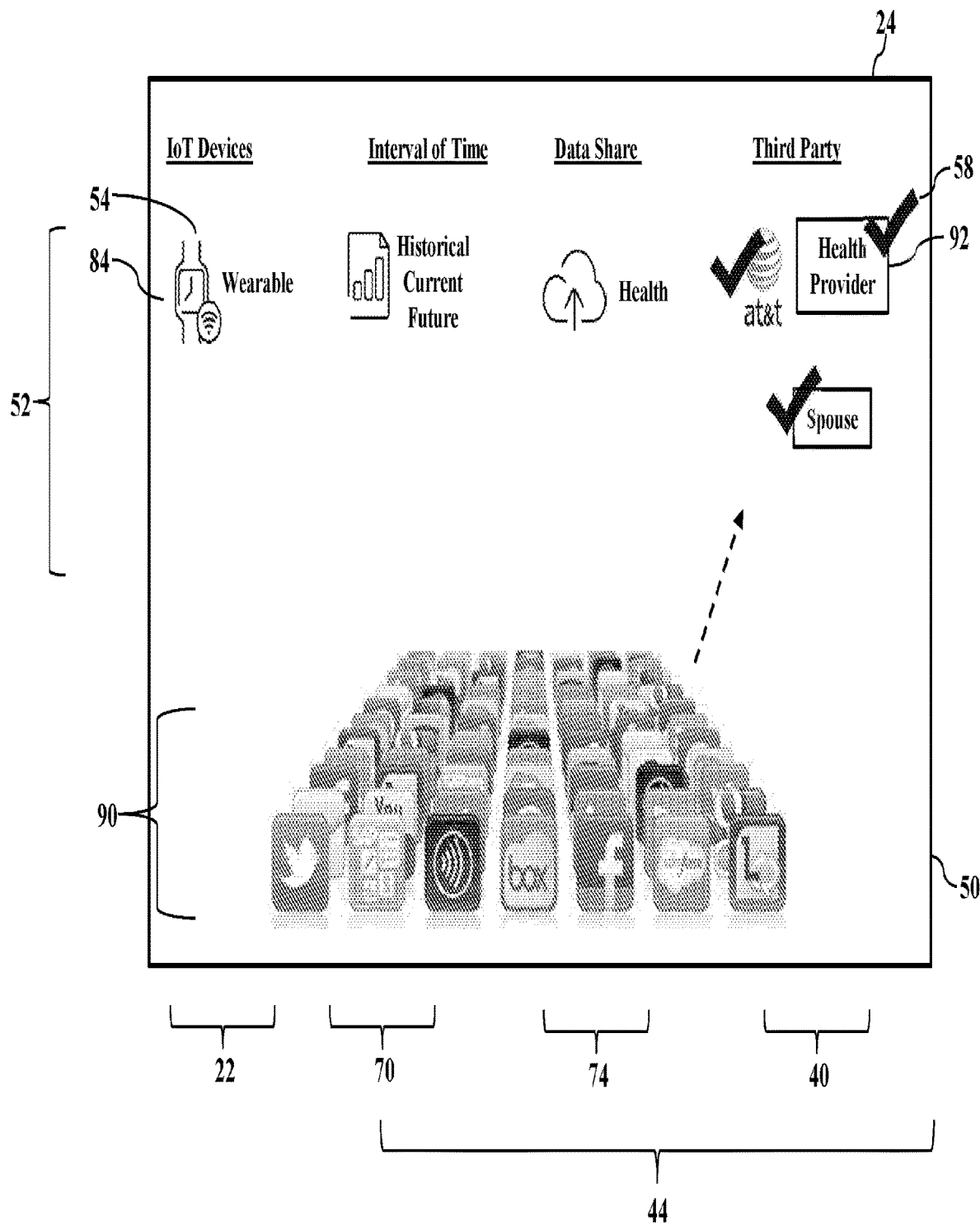

FIGS. 4-6 illustrate third party usages. Here the user may simply and quickly select third party access to any data (illustrated as reference numeral 26 in FIG. 1) generated by the user's connected devices 22. As the reader may realize, sellers of products and services covet much or most of the data 26 generated by our connected devices 22. The data 26, in general words, can be used to reveal our travel patterns, our likes, our dislikes, and our friends. The data 26 thus helps sellers push or target products and services that better appeal for probable conversion. Exemplary embodiments may thus allow the user to select which third parties 40 are permitted access to any data 26 generated by the user's connected devices 22. FIG. 4, for example, illustrates an iconic pool 90 of third party service providers. The iconic pool 90 may include a different graphical third party icon 92 representing each different third party 40. The user may thus graphically associate any connected device (represented by its corresponding device icon 54) to any third party 40 (represented by its corresponding third party icon 92).

FIG. 5 illustrates graphical association. The user may simply drag and drop one of the third party icons 92 inline with or into the desired device icon 54. FIG. 5, for example, illustrates permitted third parties 40 (illustrated as the familiar AT&T® and GENERAL MOTORS® iconic logos) having access to any historical data 26 generated by the user's connected vehicle (represented by the vehicular icon 72). The user may simply select the desired third party icon 92 and drag or move into general alignment with the tabular row associated with the connected device 22 (i.e., represented by the vehicular icon 72). Exemplary embodiments may physically and logically implement the corresponding third party service (such as automatically configuring the user's connected vehicle to send its data 26 to AT&T® and to GM®.

FIG. 6 further illustrates multiple third party sharing. As the reader may envision, there may be many third parties having permissive use of the data (illustrated as reference numeral 26 in FIG. 1) generated by any of the user's connected devices 22. Exemplary embodiments thus further allow the user to simply and quickly define third party permissions. The user may simply and graphically associate multiple ones of the third party icons 92 to any device icon 54. Each different third party icon 92 specifies the corresponding third party 40 having permissive and/or restrictive access to the data 26 generated by the connected device 22. Consider, for example, the user's wearable monitor (represented by the wearable icon 84). The user may want any health data 26 (such as blood pressure, pulse, temperature, and physical activity) shared with certain third parties 40 (such as health providers and even a spouse). The user need only graphically move the corresponding third party icons 92 into general alignment with the wearable icon 84. Exemplary embodiments may then automatically configure the corresponding third party service as a proxy on behalf of the user. That is, exemplary embodiments may automatically query for and retrieve a network address assigned to the third party's service (such as a server, website, or URL). Exemplary embodiments may then automatically ensure that the data 26 generated by the user's wearable device 22 is sent to and/or shared with the corresponding third party 40. Exemplary embodiments may even establish or configure network routing tables to ensure the data 26 is only routed or delivered to the network address assigned to the permitted third party's service. Indeed, the central portal 28 may even graphically confirm the sharing configuration, such as the checkmark 58 overlaying each third party icons 92.

Figure 7:
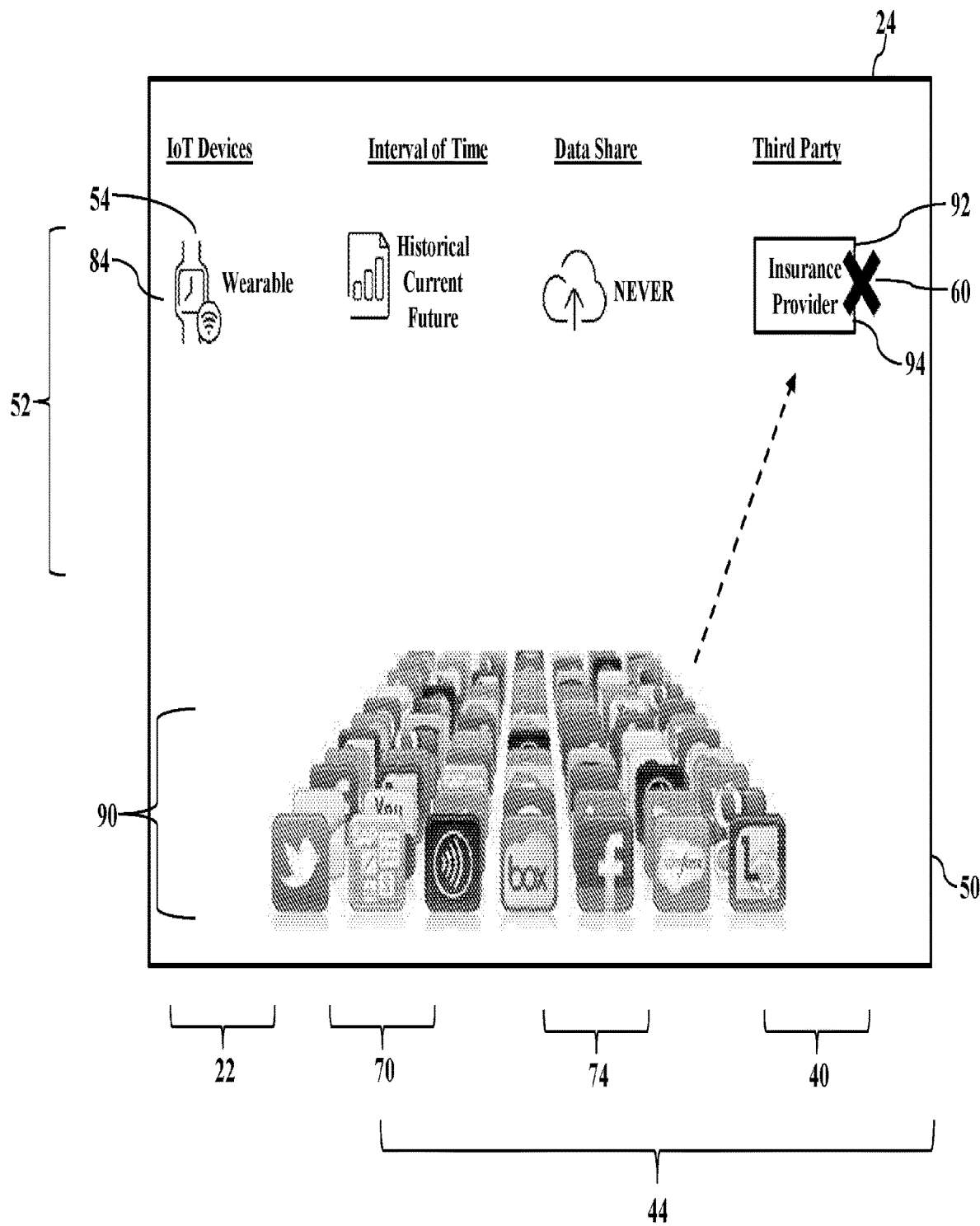

FIG. 7 illustrates usage restrictions. Here the user may explicitly prohibit a particular third party 40 from using the data generated by any of the connected devices (illustrated, respectively, as reference numerals 26 and 22 in FIG. 1). For example, consider health-related data 26. As the reader may understand, many users may not want their health-related data 26 shared with an insurance provider. Exemplary embodiments may thus permit the user to graphically restrict or prohibit sharing of the data 26 with particular third parties 40. The user may graphically move the corresponding third party icon 92 (such as "insurance provider" icon 94) into general alignment with the corresponding wearable icon 84. When the user configures the data usage 74 to "never," exemplary embodiments thus infer that any data 26 generated by the corresponding connected device 22 (such as the user's wearable monitor represented by the wearable icon 84) is prohibited from being sent or used by the third party 40. The central portal 28 may also graphically confirm the sharing prohibition by overlaying the universal "no" symbol 60.

Exemplary embodiments thus present an elegant and simple interface 50. The user may graphically establish white/black lists using the easily recognizable third party icons 92. The user may easily configure her Internet of Things without cumbersome and technical reliance on addressing and protocols. The user may define which of her connected devices 22 is sharable, when, and with whom.

Figure 8:
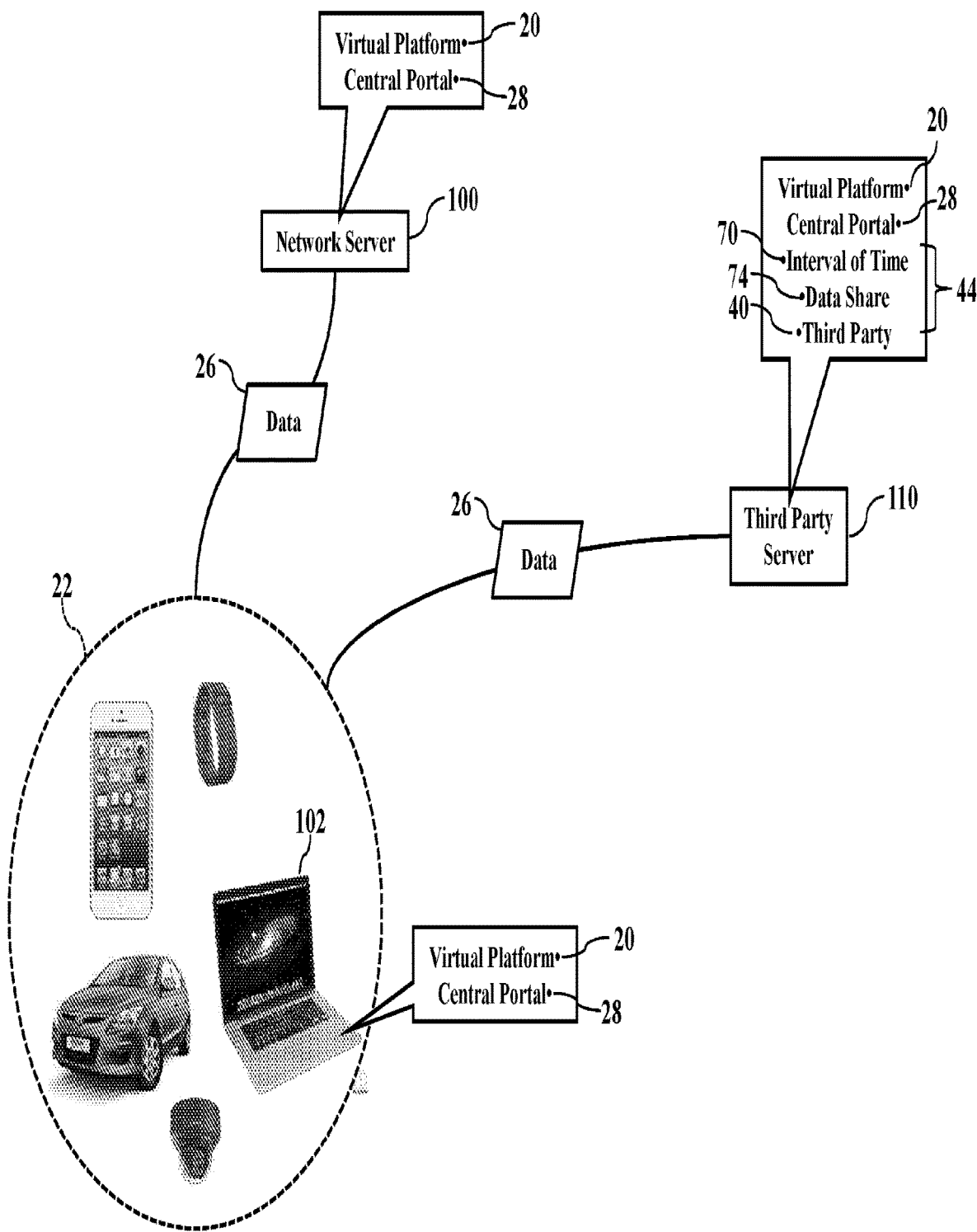

FIG. 8 illustrates management control. Exemplary embodiments may be located or installed at any location and/or device to ensure the user's configurations are honored. For example, the virtual platform 20 may be stored and executed by a network server 100. The network server 100 may communicate with any or all of the user's connected devices 22. The network server 100 may thus store the central portal 28 as a software application or algorithm that allows centralized management of the user's connected devices 22. However, the user may alternatively designate one of her connected devices 22 as a management device 102. That is, the management device 102 may store and execute the virtual platform 20 to provide the central portal 28. The user's management device 102 may communicate with any or all of the user's connected devices 22 to configure permissive usages of the sensory data 26.

FIG. 8 also illustrates third party policing. The virtual platform 20 may alternatively or additionally be stored and executed by a third party server 110 associated with the third party 40. When the third party server 110 queries for and/or receives any of the data 26 generated by the user's connected devices 22, the virtual platform 20 may force the third party 40 to adhere to the user's sharing permissions 44 (such as the interval 70 of time, the data share 74, and the third party access 40). So, even though the user may configure the virtual platform 20 (perhaps via the central portal 28), exemplary embodiments may require the third party 40 to certify its permitted use. In other words, even if the third party 40 has access to the data 26, the virtual platform 20 may prevent the third party 40 from using the data 26 contrary to the user's sharing permissions 44.

Exemplary embodiments thus help users manage their digital footprint. Users/Customers may view, track, and manage data sharing for all the devices 22 that make up their collective Internet of Things. Privacy and security may be better managed by the customer though a single sign on the central portal 28. New, sold, unused, or even legacy devices 22 that make up an individual's or a group's (e.g., family) Internet of Things may now all be managed (via the virtual platform 20 offering the central portal 28 as a utility tool). Because the user has control over the collected data 26, the user's perception of privacy is enhanced and the user's overall experience is improved. Any of the connected devices 22, regardless of manufacturer, may register and share its data 26 for an improved experience.

Figure 9:
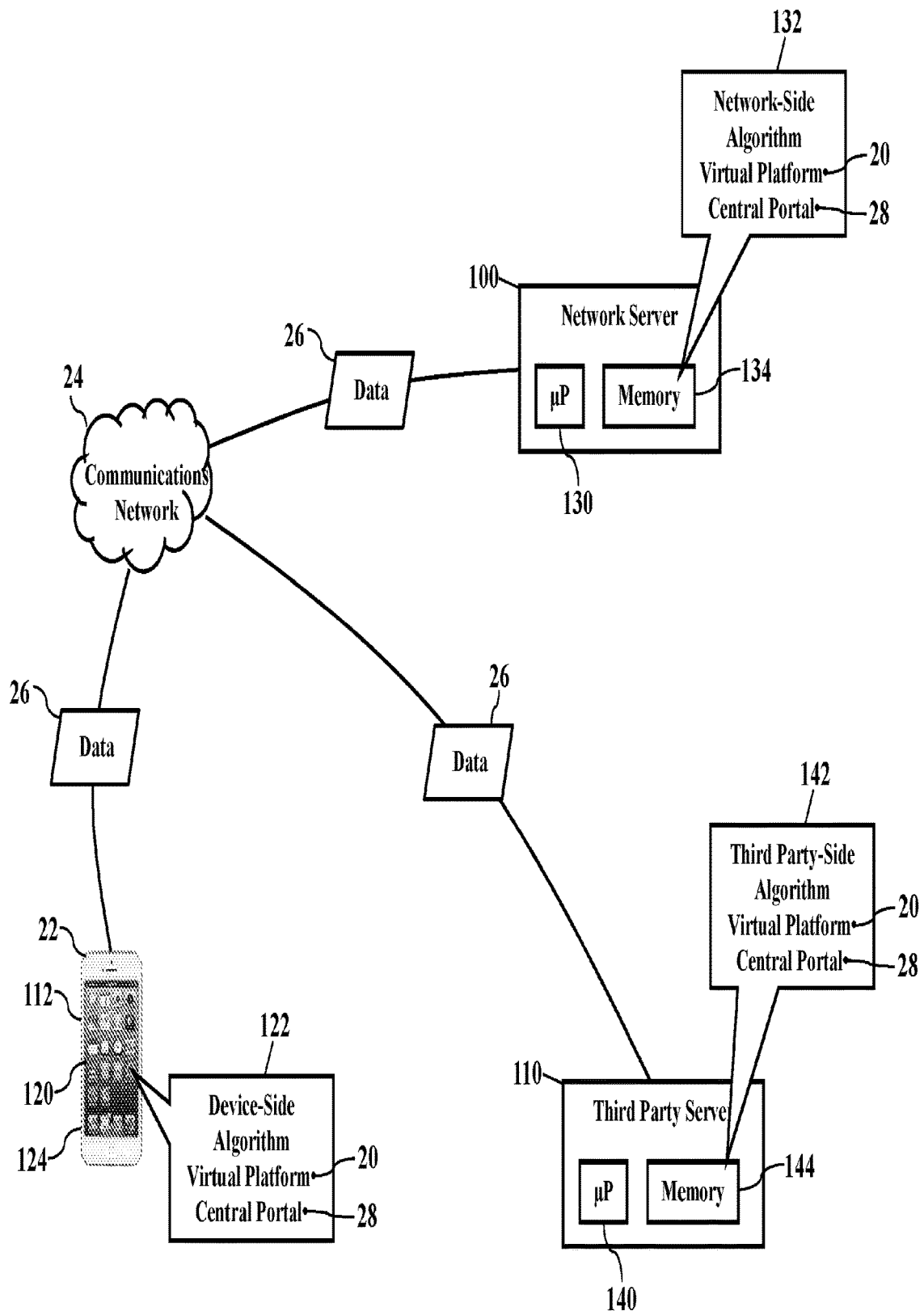
FIG. 9 is a more detailed illustration of the operating environment, according to exemplary embodiments.

FIG. 9 is a more detailed illustration of the operating environment, according to exemplary embodiments. FIG. 9 illustrates one of the user's connected devices 22 (perhaps the user's smartphone 112), the network server 100, and the third party server 110 communicating via the communications network 24. Even though the user may have many connected devices 22 (such as those illustrated in FIGS. 1-8), most readers are assumed familiar with the smartphone 112. Regardless, the connected device 22 may thus have a processor 120 (e.g., "μP"), application specific integrated circuit (ASIC), or other component that executes a device-side algorithm 122 stored in a local memory 124. The device-side algorithm 122 instructs the processor 120 to perform operations, such as generating its data 26 for wireless or wired transmission into the communications network 24 to any destination (such as the network server 100 and/or the third party server 110). The device-side algorithm 122 may include programming or code that implements the virtual platform 20 providing the central portal 28.

The network server 100 may have a management role. The network server 100 may have a processor 130 (e.g., "µP"), application specific integrated circuit (ASIC), or other component that executes a network-side algorithm 132 stored in a local memory 134. The network-side algorithm 132 instructs the processor 100 to perform operations, such as receiving and/or managing the data 26 generated by the connected device 22. The network-side algorithm 132 may include programming or code that implements any or all of the virtual platform 20 providing the central portal 28.

The third party server 110 may also have a management role. The third party server 110 may have a processor 140 (e.g., "µP"), application specific integrated circuit (ASIC), or other component that executes a third party-side algorithm 142 stored in a local memory 144. The third party-side algorithm 142 instructs the processor 140 to perform operations, such as receiving and/or managing the data 26 generated by the connected device 22. The third party-side algorithm 142 may thus also include programming or code that implements any or all of the virtual platform 20 providing the central portal 28.

Communications may be enabled. Because the user's connected device 22, the network server 100, and the third party server 110 may each communicate via the communications network 24, each may receive, send, and process information received from a network interface to the communications network 24. The information may be received as packets of data according to a packet protocol (such as any of the Internet Protocols). The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 10:
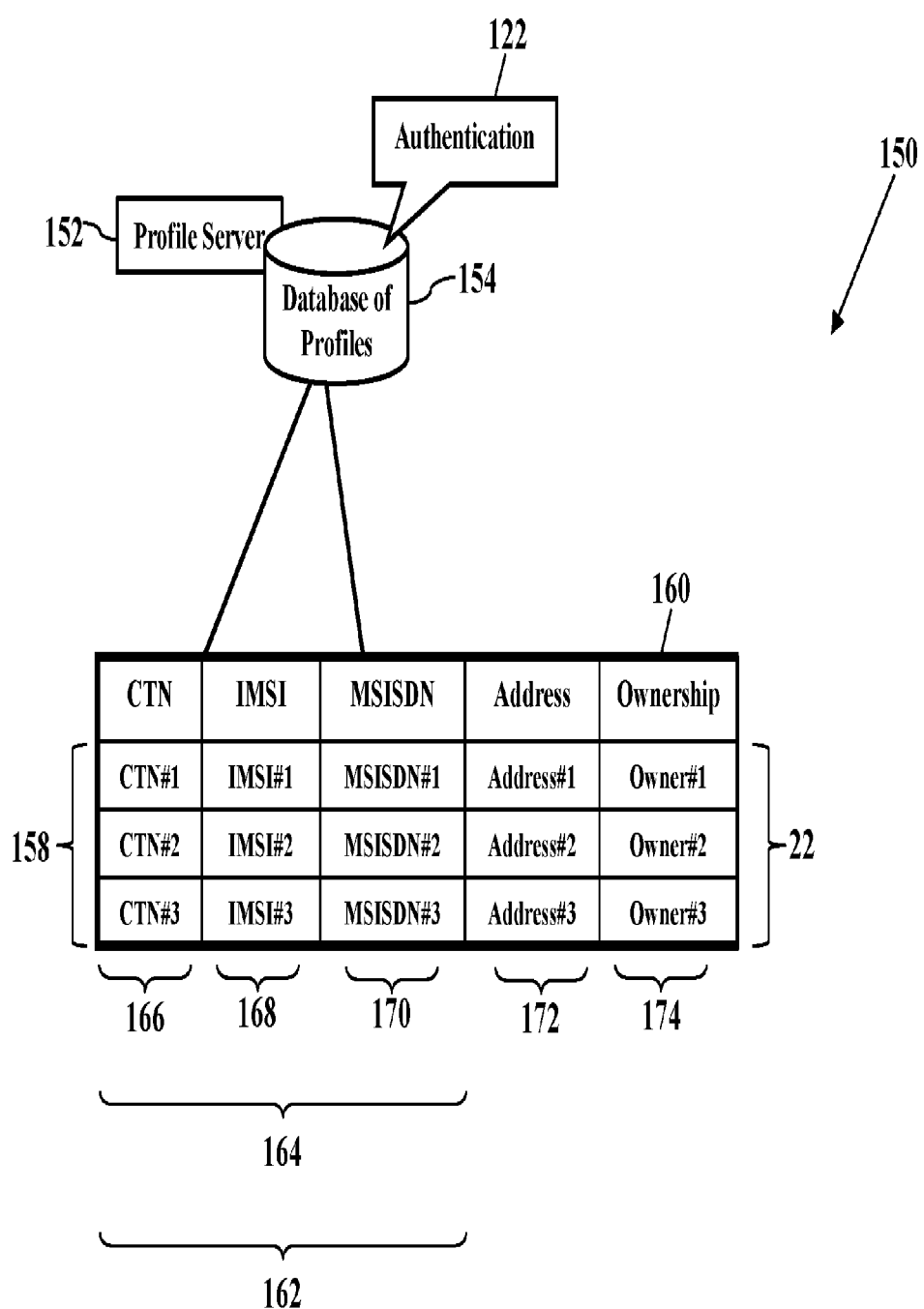
FIG. 10 illustrates profile registration, according to exemplary embodiments.

FIG. 10 illustrates profile registration, according to exemplary embodiments. Here the user may establish a profile 150 associated with her connected devices 22. The user's profile 150 may be retrieved from a centralized location, such as a profile server 152 storing an electronic database 154 of profiles. The user performs some login authentication procedure 156 (such as a username and password) to establish and modify her profile 150. When the user buys, acquires, sells, destroys, or in general registers any one of her connected devices 22, an entry may be added to or deleted from the profile 150. At any time, then, the user's profile 150 may also include a listing 158 of her connected devices 22. FIG. 10 thus illustrates the profile 150 as a table 160 having electronic database associations between different device identifiers 162 and different profile information. Exemplary embodiments may send a query (via the communications network 24 illustrated in FIG. 9) to the network address associated with the profile server 152 and retrieve any profile information.

FIG. 10 only illustrates a few entries. The user's profile 150 may store each device identifier 162 that uniquely identifies each corresponding connected device 22. While the device identifier 162 may be any alphanumeric combination, FIG. 10 illustrates a cellular identifier 164. That is, any of the user's connected devices 22 may be assigned or identified by a cellular telephone number (or "CTN") 166, International Mobile Subscriber Identity (or "IMSI") 168, or Mobile Station International Subscriber Directory Number ("MSISDN") 170. Whenever the connected device 22 sends messages or information, the connected device 22 may include or self-report the CTN 166, IMSI 168, and/or MSISDN 170. Moreover, the connected device 22 may also include or self-report its corresponding network address 172 (such as an Internet Protocol address or mask/subnet mask). Each connected device 22 may also be electronically associated with ownership information 174 (such as a name and address obtained during registration). Should any networked element (such as one of the user's other connected devices 22, the network server 100, or the third party server 110) need profile details, the networked element need only query the profile 150. While FIG. 10 only illustrates a few entries, in actual practice the electronic database 154 of profiles may have hundreds, thousands, or even millions of entries for many different users and many different devices.

Figure 11:
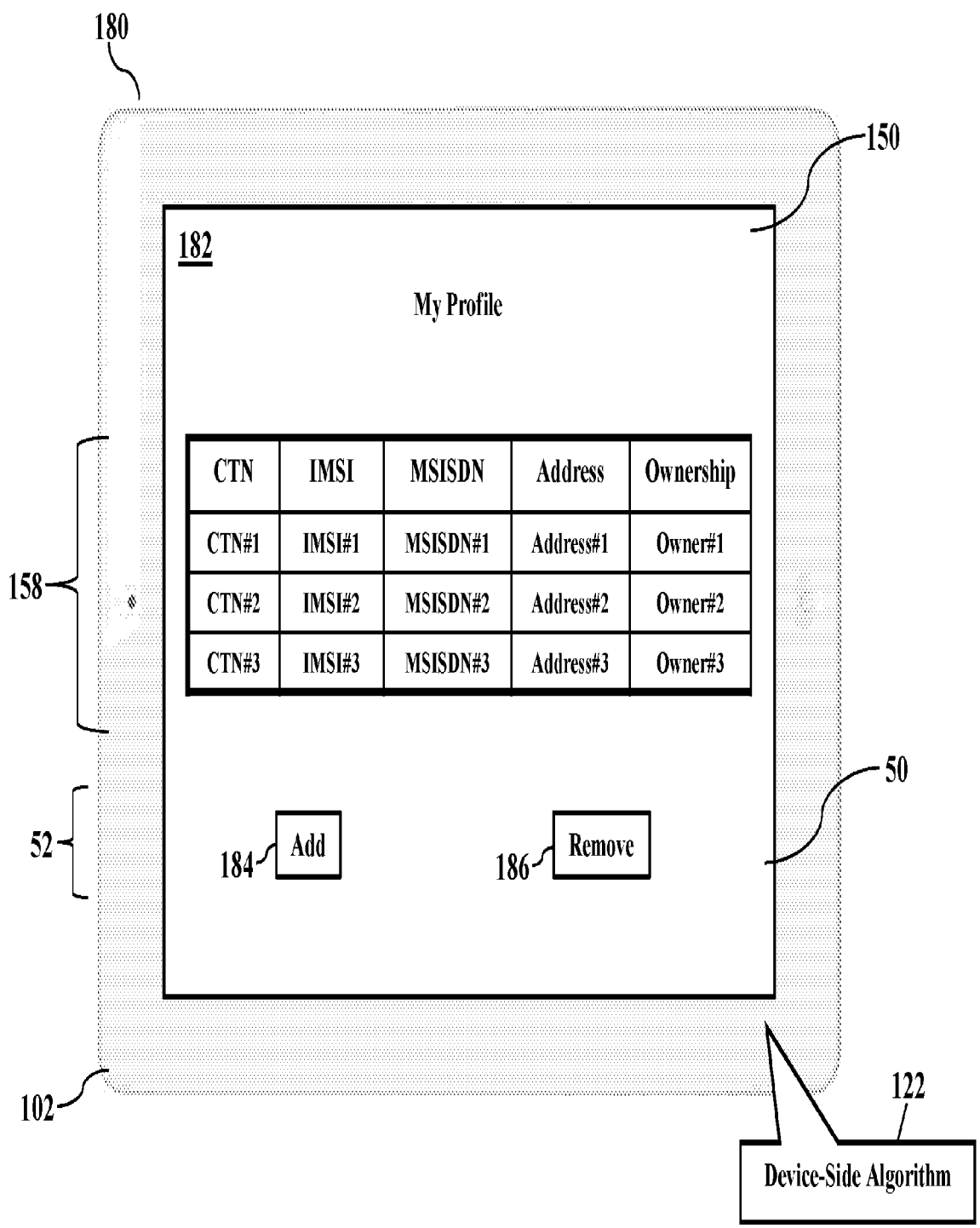
FIG. 11 illustrates device affiliation, according to exemplary embodiments.

FIG. 11 illustrates device affiliation, according to exemplary embodiments. Here the user may establish what connected devices 22 are associated with her profile 150. As the reader may understand, over time we add and remove devices for many reasons. For example, we may drop our smartphone and purchase a replacement. A device 22 may become obsolete in performance and/or features. We may buy secondhand devices (such as used smartphones). The profile 150, then, should accurately reflect the connected devices 22 currently owned by, and/or operating on behalf of, the user. FIG. 11 thus illustrates the user's management device 102 as a tablet computer 180 executing the device-side algorithm 122. The tablet computer 180 generates the graphical user interface 50 on a display device 182. For simplicity, the graphical user interface 50 presents the user's profile information (such as the tabular listing 158 of the user's connected devices) along with corresponding graphical controls 52. An "Add" button 184, for example, would allow the user to click and add a new device 22 to her profile 150. A "Remove" button 186 would, instead, remove an existing device from the profile 150. So, as ownership and/or operability changes, the user may easily update her profile 150.

Figure 12:
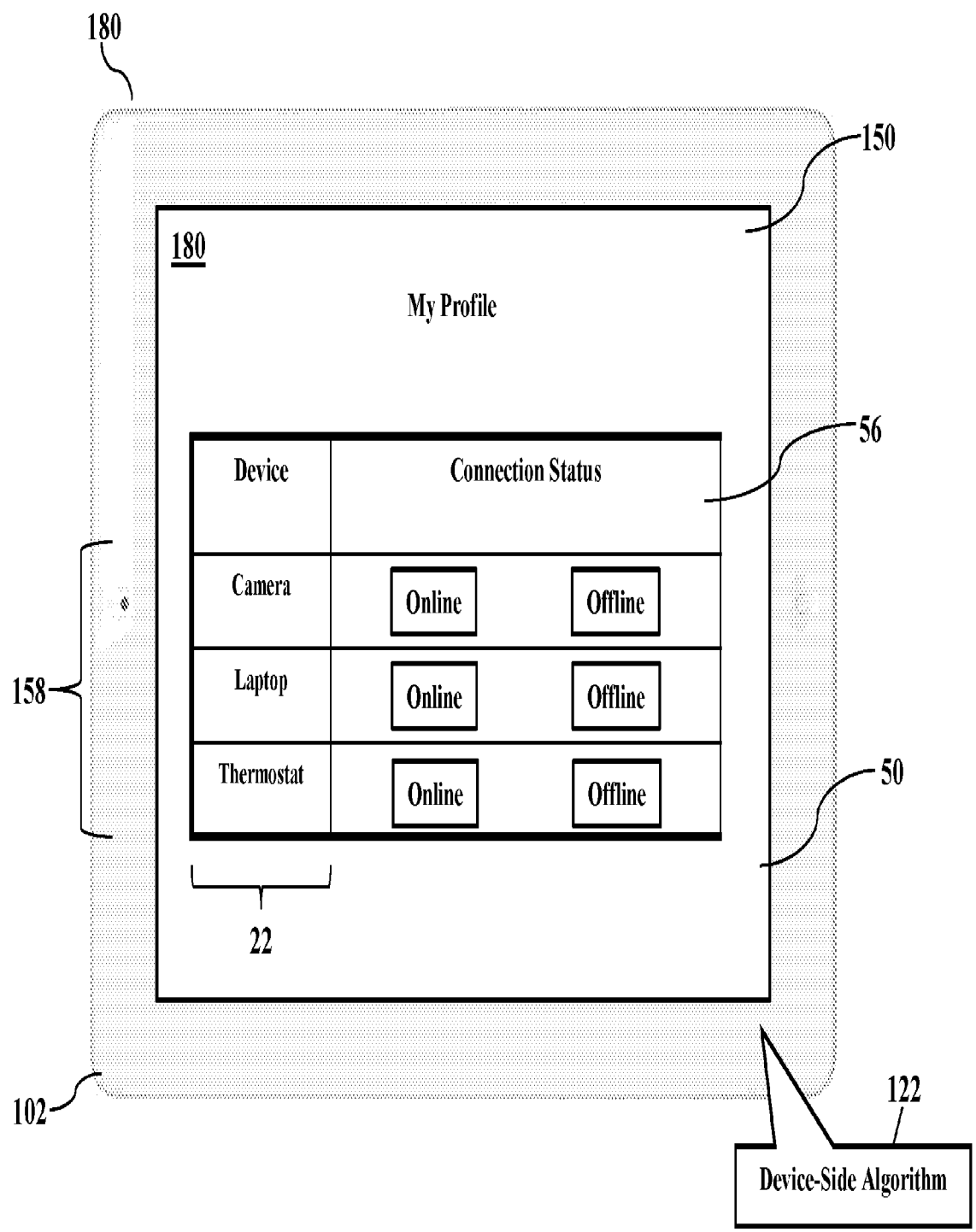
FIG. 12 illustrates individual network connectivity, according to exemplary embodiments.

FIG. 12 illustrates individual network connectivity, according to exemplary embodiments. Here the user interface 50 also allow the user to tactilely change the connection status 56 associated with any device 22. An "Online" button control, for example, would allow the user to turn on and activate the network interface associated with the corresponding device 22. The "Offline" button, though, turns off or deactivates the network interface. The central portal 28 thus allows the user to remotely manage the individual network connectivity of any connected device 22 associated with the profile 150.

Figure 13:
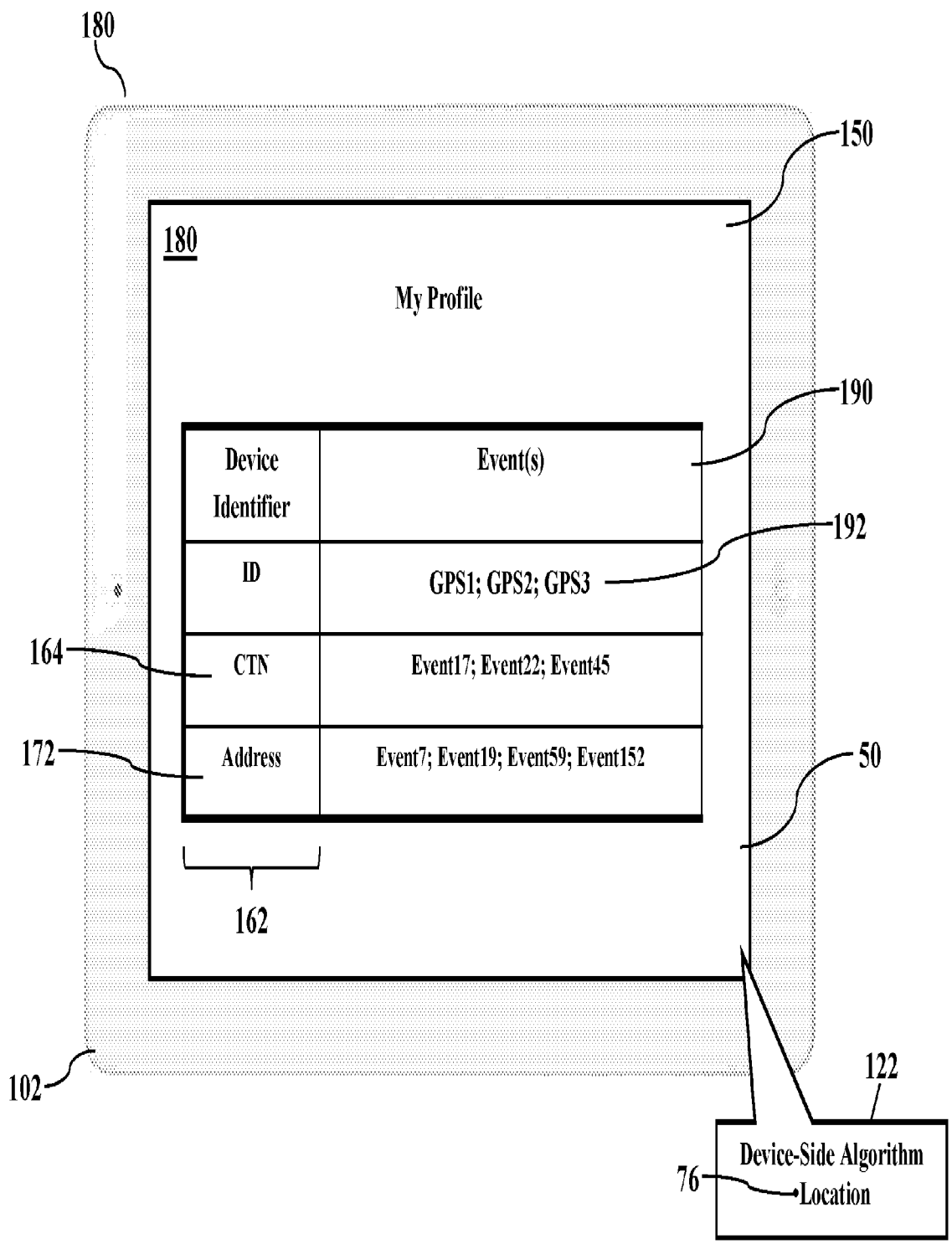
FIGS. 13-14 illustrate profile events, according to exemplary embodiments.
Figure 14:
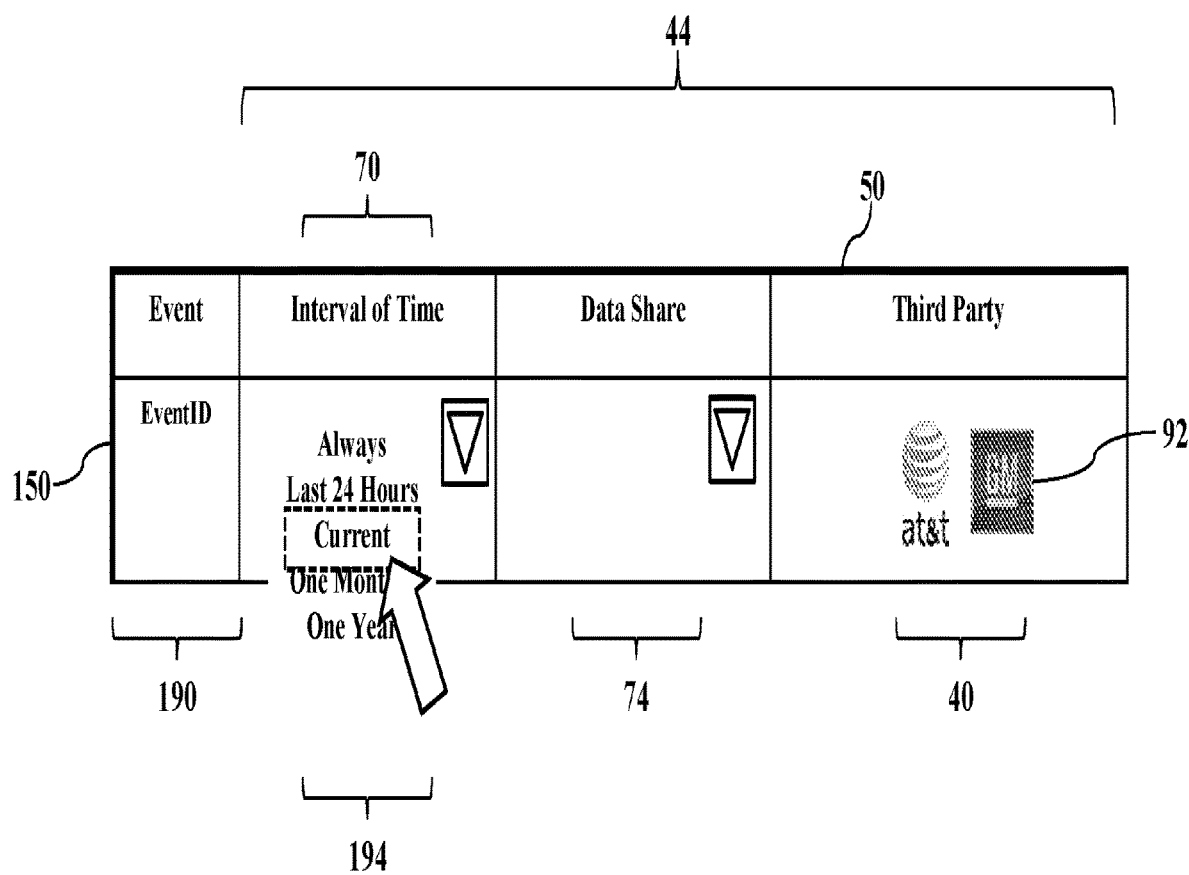
Figure 14:
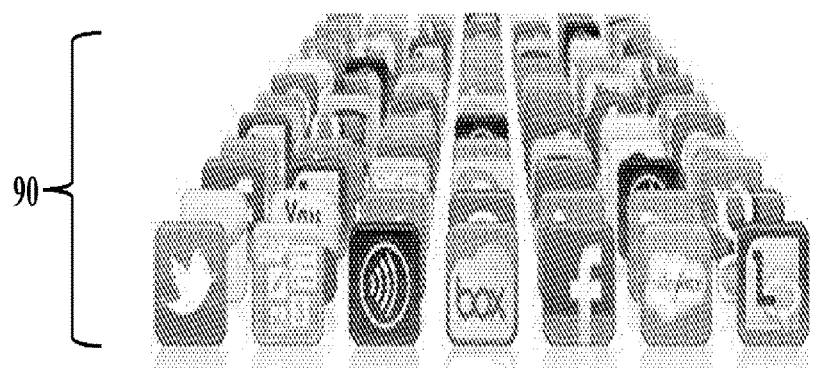

FIGS. 13-14 illustrate profile events 190, according to exemplary embodiments. Here the central portal 28 may allow the user to define what type of the data 26 is collected. Some connected devices 22 may only generate a single output variable in response to a single input. A temperature sensor, for example, produces a voltage (transducer) representing an ambient temperature. A position sensor, likewise, generates a voltage in response to a positional (linear or rotational) change. Other sensors, though, are more sophisticated and may produce one or more outputs in response to multiple inputs. The user's tablet computer 180, for example, is one example of the connected device 22 that can generate different types of the data 26 in response to different inputs. The tablet computer 180 may obtain its geographical location (using a GPS transceiver), obtain an accelerometer input value (via an internal accelerometer), and monitor content sections to determine different physical activities. The tablet computer 180, in other words, may generate many different types of the data 26 in response to many different inputs.

FIG. 13 thus illustrates different profile events 190. Here the user may configure her profile 150 to define what data 26 is/are reportable or sharable. A simple profile event 190 may be defined using the GPS information 192 representing the current location 76 associated with the tablet computer 180. The user, in simple words, may define which geographical locations 76 are sharable. The user may not care about sharing the locations 76 representing her travels, but she may prohibit revealing the location 76 of her work and/or her home. Some of the events 190 may thus be defined in terms of coordinates, addresses, or terms representing permissible and impermissible GPS information 192. Each profile event 190 may thus be defined as an electronic database association between the device identifier 162 (such as its cellular identifier 164 and/or its network address 172) and the corresponding sharable/unsharable events 190. The user may cause her profile 150 to be populated with different types of the events 190 for which she approves sharing. The user's profile 150 may thus have many different entries defining sharable events 190 and unsharable or private events 190.

FIG. 14 illustrates the sharing permissions 44. Once the user defines the event 190, the user may then define the corresponding interval 70 of time, the data share 74, and the third party access 40. Even though a particular event 190 may be sharable, the user may further define or restrict the interval 70 of time of sharability, how the event 190 is used (via the data share 74), and who can access the event 190 (via the third party access 40). FIG. 14 thus again illustrates the central portal 28 having entries or data fields for further configuring the sharable event 190. While only one (1) sharable event 190 is shown, the reader will understand that any other events 190 (as illustrated in FIG. 13) may be similarly configured. The user's profile 150 may thus be fully configured to define exactly what information or messages (such as the data 26 illustrated in FIG. 1) gets reported or shared and with whom.

Exemplary embodiments may include pre-configured options. Even though the event 190 may be elaborately and finely defined, most users will find manual configuration too cumbersome and perhaps too difficult. FIG. 14 thus illustrates pre-defined configuration options. That is, the interval 70 of time may have a drop-down menu 194 of different selections, thus allowing the user to easily select her desired interval 70 of time. The data share 74 may also have its corresponding drop-down menu of different selections (not shown for simplicity). Moreover, the user may also select the third party icon 92 from the pool 90 of icons, thus further simplifying which third parties 40 have access to the permissible event 190.

Figure 15:
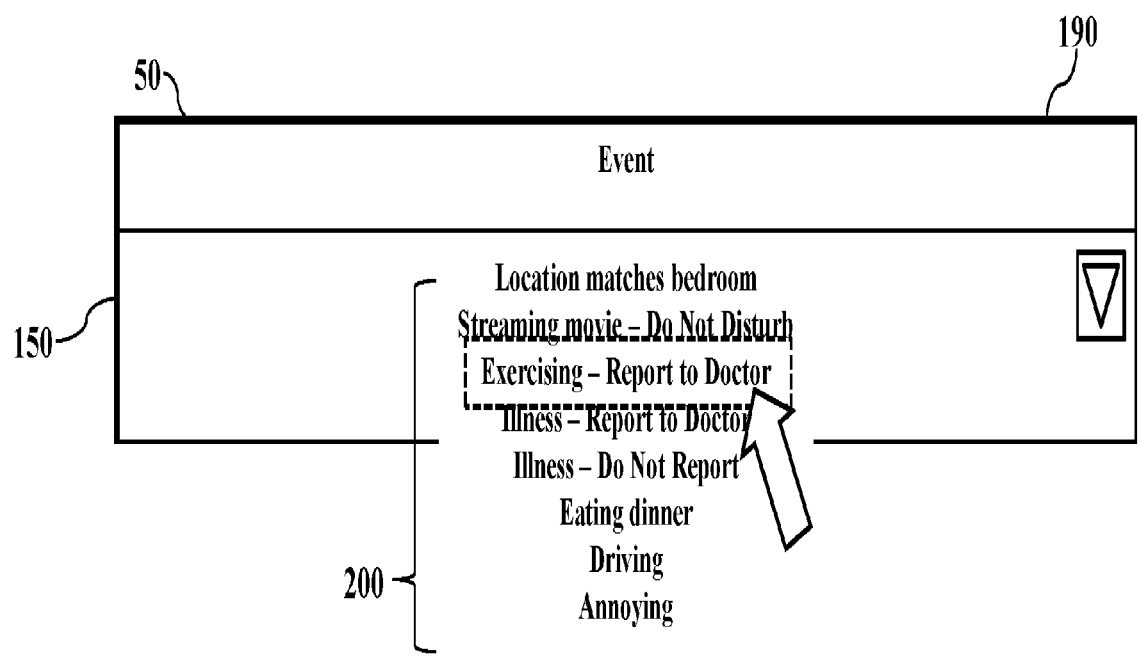
FIGS. 15-16 illustrate pre-defined events, according to exemplary embodiments.
Figure 16:
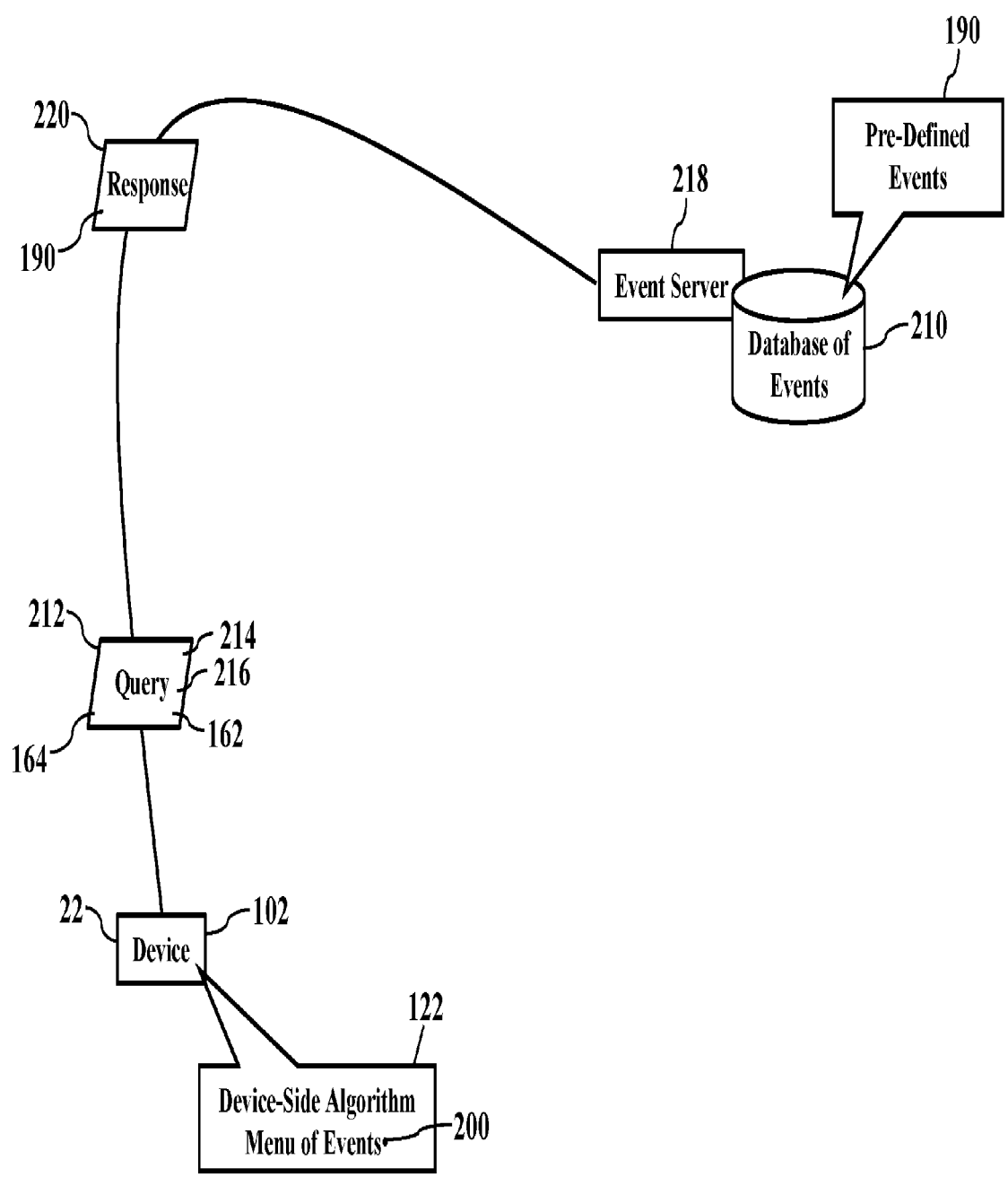

FIGS. 15-16 illustrate pre-defined events 190, according to exemplary embodiments. As the reader may also envision, many users may also have difficulty defining the different events 190. Because the connected device 22 may have many functional capabilities (especially the user's smartphone 112 and tablet computer 180 illustrated in FIGS. 9 and 11-13), event definition may likely be very technical. Exemplary embodiments, then, may include a menu 200 of events. Once the connected device 22 is identified (as discussed with reference to FIG. 10), exemplary embodiments may display the menu 200 of events within the interface 50. The drop-down menu 200 of events may display or present different selections of pre-defined or pre-configured events 190. The user need only select her desired pre-defined event 190 and exemplary embodiments may automatically configure on her behalf. Each pre-defined event 190 may describe any operational or functional feature related to the corresponding connected device 22. The user may merely touch or otherwise select her desired pre-defined event 190 (and its corresponding sharing permissions 44, as FIG. 14 illustrated).

FIG. 16 illustrates a database 210 of events. Once any connected device 22 is identified, exemplary embodiments may generate and send a query 212 for the corresponding menu 200 of events. The query 212 may include a search term that identifies the corresponding connected device 22. The query 212, for example, may include information that specifies a model number 214, a serial number 216, and/or the device identifier 162 associated with the device 22. FIG. 16 illustrates the query 212 routing (via the communications network 24 illustrated in FIG. 9) to a network address associated with an event server 218. The event server 218 may locally store the database 210 of events in memory (not shown for simplicity). When the event server 218 receives the query 212, a processor queries the database 210 of events for the search term specified in the query 212 and retrieves any matching entry or entries. The event server 218, for example, retrieves the one or more pre-defined events 190 having an electronic database association with the search term. The database 210 of events may thus have hundreds, thousands, or even millions of entries associated with different devices. The event server 218, in other words, may be a central repository for the pre-defined events 190 associated with any manufacturer's connected device 22. Regardless, the event server 218 sends a query response 220, which FIG. 16 illustrates as routing back to the network address associated with the user's management device 102. The query response 220 may include any information describing the various pre-defined events 190 that corresponding to the search term (such as the cellular identifier 164). Exemplary embodiments may then populate the menu 200 of events with the pre-defined events 190 that correspond to the connected device 22. The user may merely touch or otherwise select her desired pre-defined event 190 and define its corresponding sharing permissions 44. Exemplary embodiments thus relieve the user from manual definition of any events 190.

Figure 17:
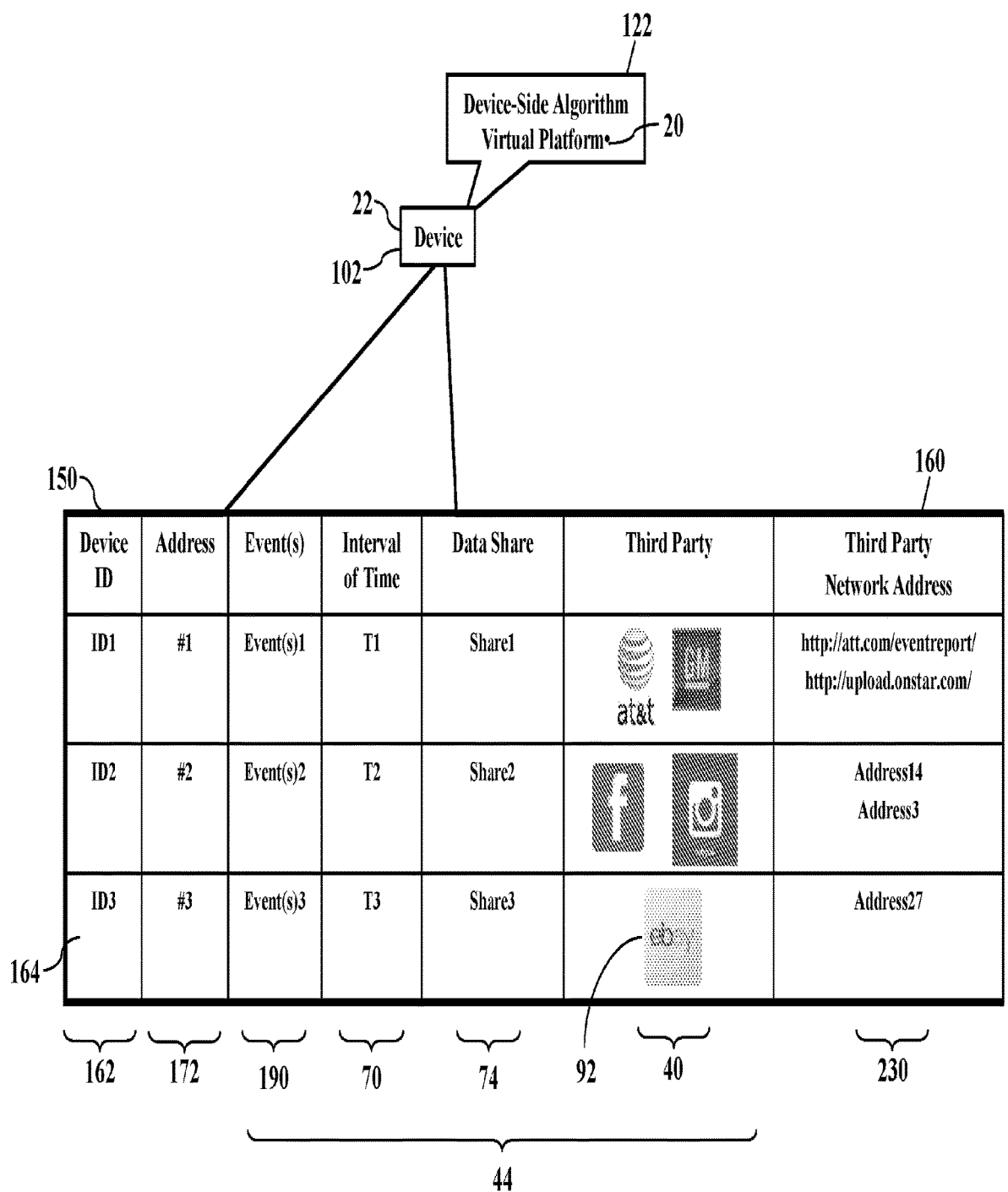
FIG. 17 illustrates auto-configuration, according to exemplary embodiments.

FIG. 17 illustrates auto-configuration, according to exemplary embodiments. Once the user defines the sharable events 190 and their corresponding sharing permissions 44, exemplary embodiments may automatically configure the user's Internet of Things. For example, the virtual platform 20 may retrieve a third party network address 230 that corresponds to the third party icon 92 representing the third party 40 having access to the permissible event 190. The third party icon 92, for example, may be uniquely associated with the third party network address 230. Once the user specifies the third party icon 92, the virtual platform 20 may infer that the third party has a sharing permission to receive the electronic data 26 generated by the connected device 22. Exemplary embodiments may thus query for the third party icon 92 (via the communications network 24 illustrated in FIG. 9) and retrieve the corresponding third party network address 230. The third party network address 230 may thus be assigned to the third party server 110 for receiving the data 26 (associated with the permissible event 190) generated by the connected device 22 (all illustrated in FIG. 9). Exemplary embodiments may thus automatically populate an entry in the user's profile 150 that associates the permissible event 190 to the third party icon 92 and to the corresponding third party network address 230. Auto-configuration thus automatically determines where the permissible event data 26 is sent for sharing. The user is thus relieved of the cumbersome routing details.

The profile 150 may grow. As the user acquires more and more connected devices 22, over time the user's electronic profile 150 will grow to include many entries representing many different devices 22. The user's electronic profile 150 may thus map, relate, or associate the user's different connected devices 22 (represented by their device identifier 162) to their corresponding sharable events 190. Exemplary embodiments may thus query for any entry in the user's electronic profile 150 and retrieve or lookup other entries having electronic tabular associations with the query. As one example, exemplary embodiments may query for the third party icon 92 (perhaps as a digital image or other unique third party identifier) and retrieve the corresponding third party address 230.

Figure 18:
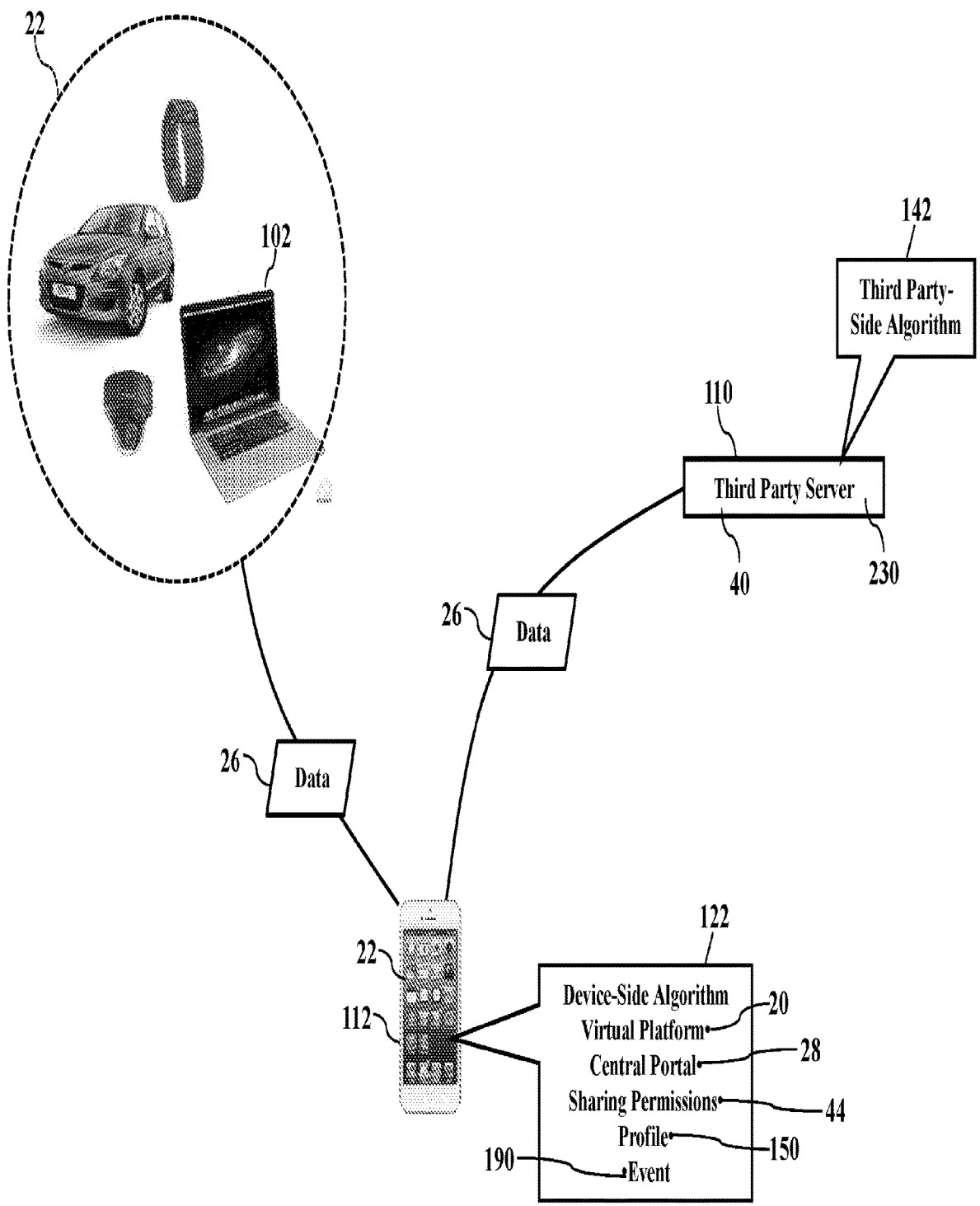
FIGS. 18-21 illustrate policing of profiles, according to exemplary embodiments.

FIGS. 18-22 illustrate policing of the profile 150, according to exemplary embodiments. Once the user configures her profile 150, her connected devices 22 may generate and share their respective data 26. FIG. 18, for simplicity, illustrates the user's smartphone 112 as one of the user's connected devices 22. The smartphone 112 generates its data 26 according to the permissible events 190 defined by the user's profile 150. The device-side algorithm 122 may then instruct or cause the smartphone 112 to send the data 26 to any destination. FIG. 18 illustrates the smartphone 112 sending the data 26 to any of the user's other connected devices 22. The smartphone 112, in other words, may share its data 26 with the network addresses 172 or the cellular identifiers 164 associated with the other connected devices 22 listed in the user's profile 150 (as FIG. 17 best illustrates). However, the smartphone 112 may also send the data 26 to the third party address(es) 230 also defined in the user's profile 150. That is, once the data 26 is generated for the permissible event 190, the device-side algorithm 122 may cause the smartphone 112 to query the profile 150 for the corresponding third party address 230 (associated with the third party server 110). Exemplary embodiments may thus send the corresponding packets of data to the third party 40 having permission to use or access the data 26.

FIG. 18 also illustrates device-side policing. Any of the user's connected devices 22 may ensure that the user's sharing permissions 44 are honored. For example, before the smartphone 112 generates or sends the data 26, the smartphone 112 may consult and enforce the user's profile 150. That is, the smartphone 112 may generate much data 26 and compare to the user's profile 150. If any of the data 26 matches or qualify as one of the permissible events 190, then the smartphone 112 may further compare to the corresponding sharing permissions 44. The device-side algorithm 122 may thus enforce the user's profile 150 as a series or sequence of gates before the data 26 is permissively shared. Once the sharing permissions 44 are satisfied, the device-side algorithm 122 may release the data 26 to its corresponding destination (such as the third party address 230). The smartphone 112, in other words, may enforce the data 26 it generates.

Figure 19:
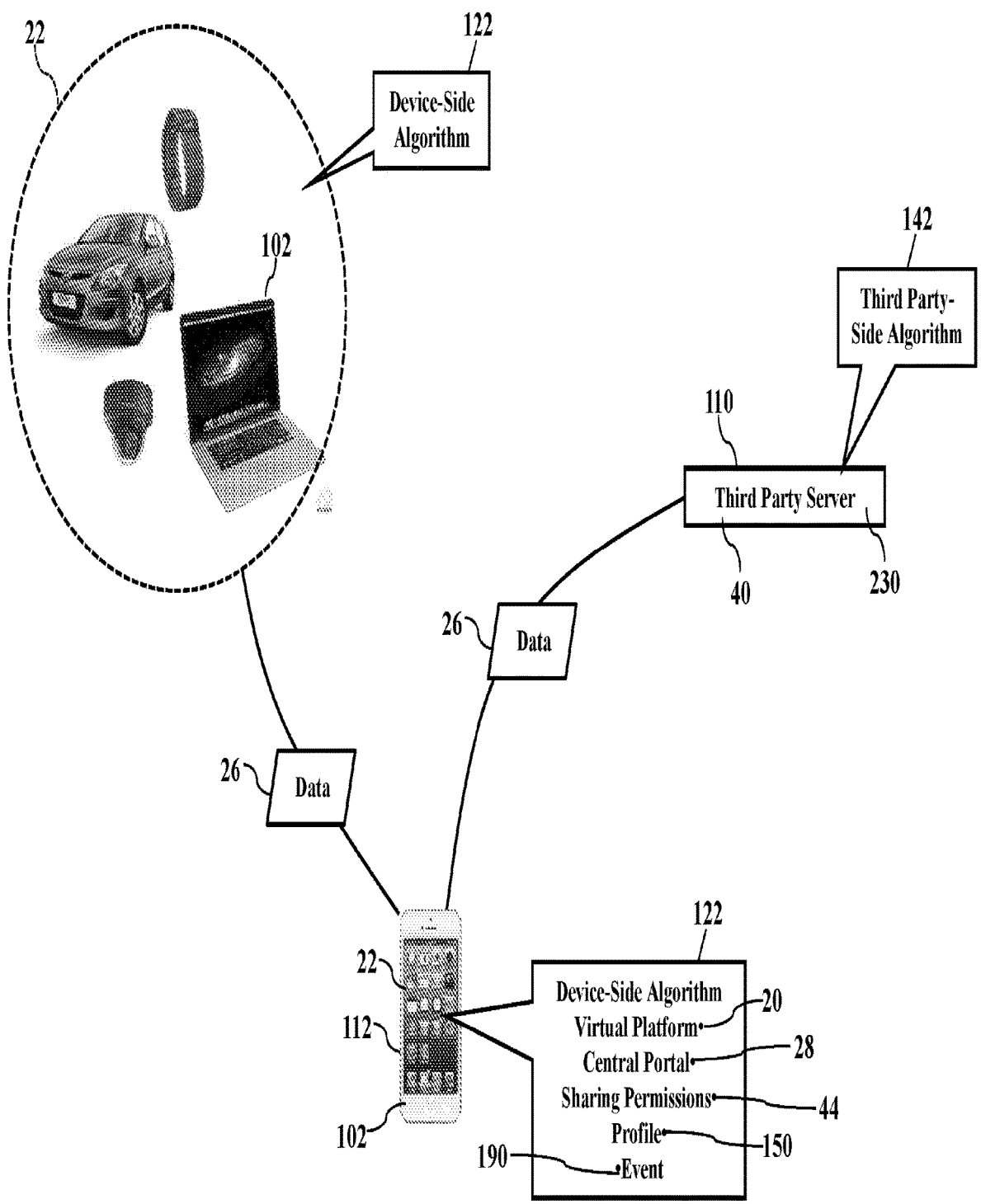

FIG. 19 also illustrates device-side policing. Here, though, any one of the user's connected devices 22 may police the data 26 generated by a different one of the user's connected devices 22. Suppose, for example, the user establishes the smartphone 112 as the management device 102. The smartphone 112 likely has sufficient processing and memory capabilities for centralized management of the user's connected devices 22. Here, then, any of the data 26 generated by any of the connected devices 22 may first be sent or routed to the network address associated with the smartphone 112. The smartphone 112 may thus act as a gatekeeper or enforcer of the user's profile 150. The user's family of connected devices 22 may thus execute instructions or programming that require any of the data 26, generated by any one of the connected devices 22, be sent to the management device 102. The device-side algorithm 122 may then compare the data 26 to the permissible events 190 associated with the sending connected device 22. If the data 26 represents or describes a permissible or sharable event 190, then the device-side algorithm 122 may further evaluate the corresponding sharing permissions 44. Again, then, here the smartphone 112 (acting as the management device 102) enforces the user's profile 150 as a series or sequence of gates before the data 26 is permissively shared. Once the sharing permissions 44 are satisfied, the device-side algorithm 122 may release the data 26 to its corresponding destination (such as the third party address 230).

Figure 20:
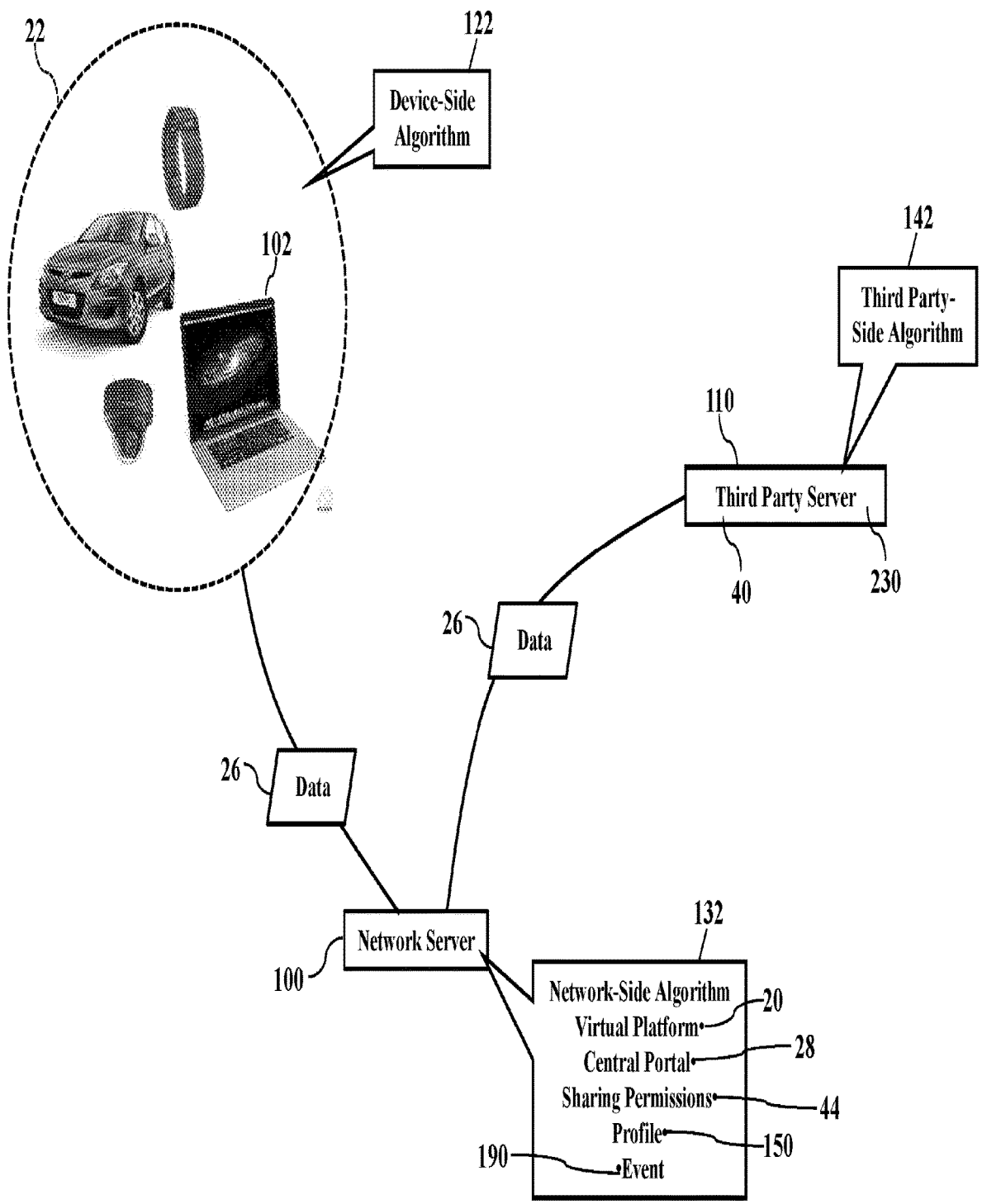

FIG. 20 illustrates network policing. Here the network server 100 may ensure the user's profile 150 is honored. That is, any of the data 26 generated by any of the connected devices 22 may first be sent or routed to the network address associated with the network server 100. The network-side algorithm 132 may thus cause the network server 100 to enforce the user's profile 150. The user's family of connected devices 22 may thus execute instructions or programming that require any of the data 26, generated by any one of the connected devices 22, be sent to the network server 100. The network server 100 may then compare the data 26 to the permissible events 190 associated with the sending connected device 22. If the data 26 represents or describes any of the permissible or sharable events 190, then the network server 100 may further evaluate the corresponding sharing permissions 44. Again, then, here the network server 100 acts as the gatekeeper and enforces the user's profile 150 before the data 26 is permissibly shared. Once the sharing permissions 44 are satisfied, the network server 100 may release the data 26 to its corresponding destination (such as the third party address 230).

Figure 21:
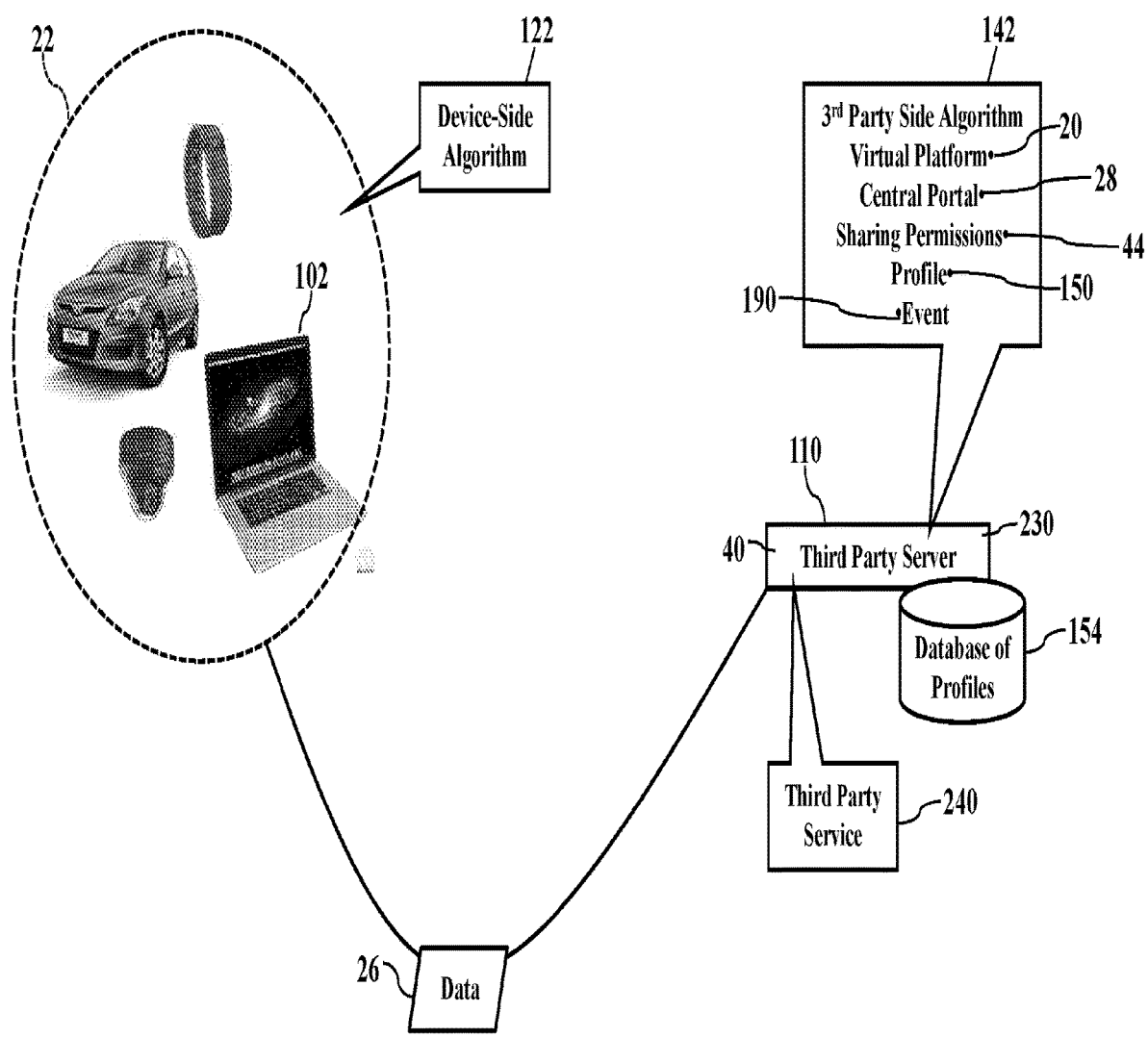

FIG. 21 illustrates third party policing. Here the third party 40 may be obligated to enforce and honor the user's profile 150. That is, any of the data 26 (generated by any of the user's connected devices 22) may be sent or routed to the third party network address 230 associated with the third party 40 (such as the third party server 110). When the third party 40 receives the data 26, the data 26 may be used to identify the user's profile 150. For example, the sending address (such as the device's network address 172 or cellular identifier 164) may be used to query the database 154 of profiles and to retrieve the user's corresponding profile 150. Once the profile 150 is determined, the third party-side algorithm 142 may compare the data 26 to the profile 150. The third party server 110, for example, may compare the data 26 to the entries in the profile 150 that are associated with the device identifier 162, cellular identifier 164, and/or the sending address 172 (all illustrated in FIG. 17). If the data 26 represents or describes any of the permissible or sharable events 190, then the third party server 110 may further evaluate the corresponding sharing permissions 44. That is, the third party server 110 may self-police its use of or access to the data 26. Should the third party server 110 determine or even certify that the sharing permissions 44 are satisfied, the third party server 110 may approve some third party service 240.

Figure 22:
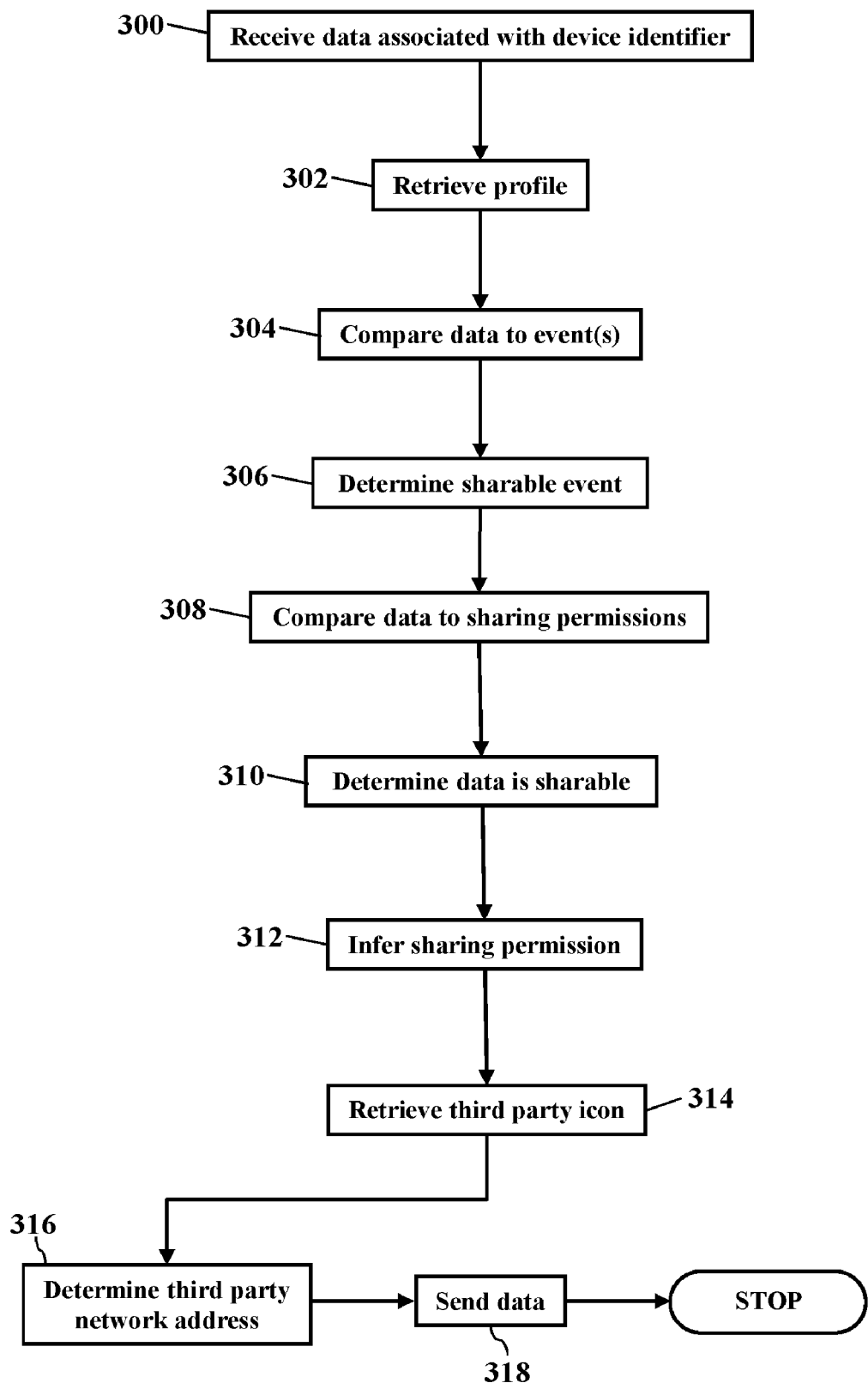
FIG. 22 is a flowchart illustrating an algorithm or method for sharing data, according to exemplary embodiments.

FIG. 22 is a flowchart illustrating an algorithm or method for sharing the data 26, according to exemplary embodiments. The data 26 associated with the device identifier 162 is received (Block 300). The profile 150 is retrieved (Block 302). The data 26 is compared to the events 190 defined in the profile 150 (Block 304). If the data 26 represents a sharable event 190 (Block 306), the data 26 is compared to the sharing permissions 44 (Block 308). If the data 26 satisfies the sharing permissions 44 (Block 310), the virtual platform 20 may infer that the third party 40 has a sharing permission to receive the electronic data 26 (Block 312). The third party icon 92 is retrieved (Block 314), the third party network address 230 is determined (Block 316), and the data 26 is sent to the third party network address 230 (Block 318).

Figure 23:
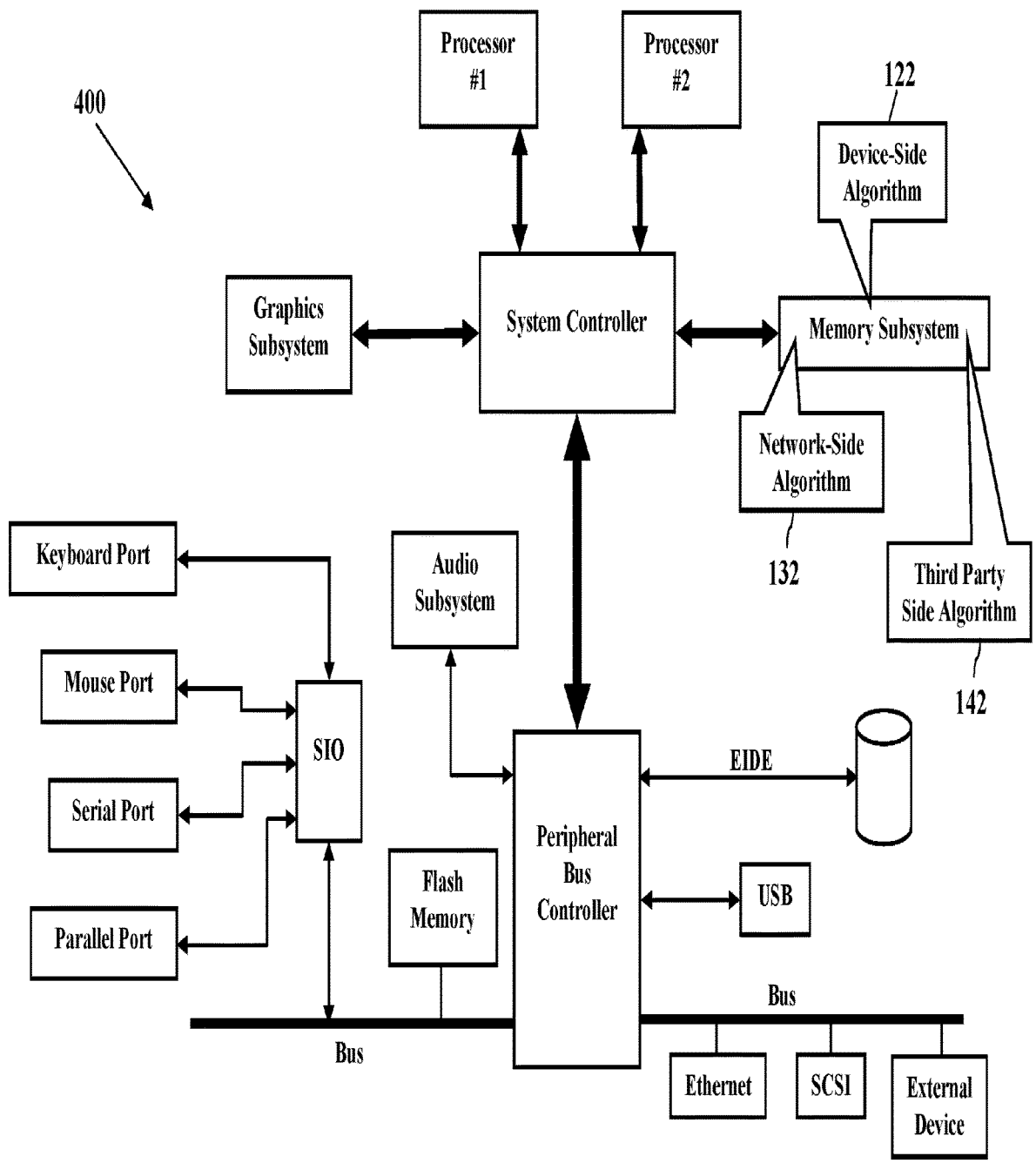
FIGS. 23-28 depict still more operating environments for additional aspects of the exemplary embodiments.

FIG. 23 illustrates still more exemplary embodiments. FIG. 23 is a more detailed diagram illustrating a processor-controlled device 400. As earlier paragraphs explained, exemplary embodiments may partially or entirely operate in any mobile or stationary processor-controlled device. FIG. 23, then, illustrates the device-side algorithm 122, the network-side algorithm 132, and/or the third party-side algorithm 142 stored in a memory subsystem of the processor-controlled device 400. One or more processors communicate with the memory subsystem and execute either, some, or all applications. Because the processor-controlled device 350 is well known to those of ordinary skill in the art, no further explanation is needed.

Figure 24:
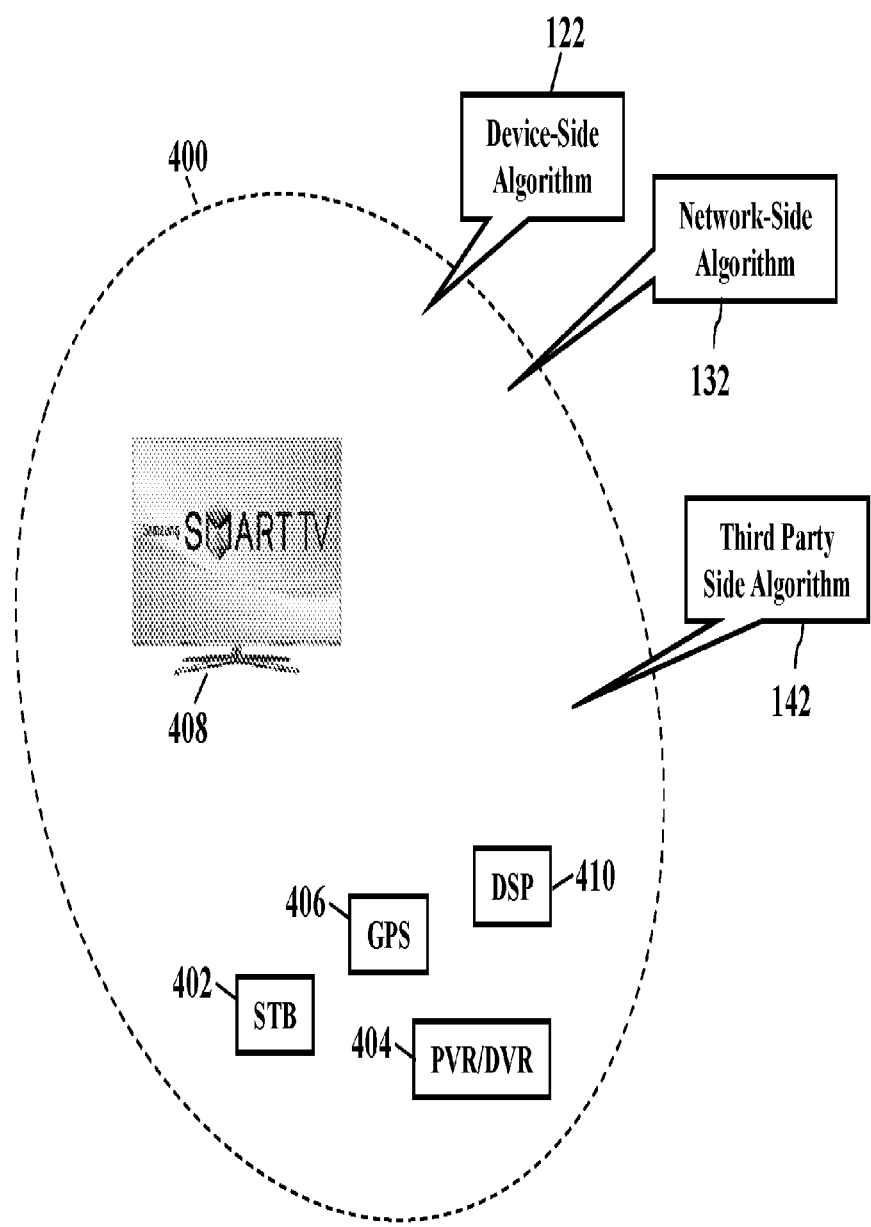

FIG. 24 depicts other possible operating environments for additional aspects of the exemplary embodiments. FIG. 24 illustrates the device-side algorithm 122, the network-side algorithm 132, and/or the third party-side algorithm 142 operating within various other processor-controlled devices 400. FIG. 24, for example, illustrates a set-top box ("STB") (402), a personal/digital video recorder (PVR/DVR) 404, a Global Positioning System (GPS) device 406, an interactive television 408, and any other computer system, communications device, or processor-controlled device utilizing the processor and/or a digital signal processor (DP/DSP) 410. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Figure 25:
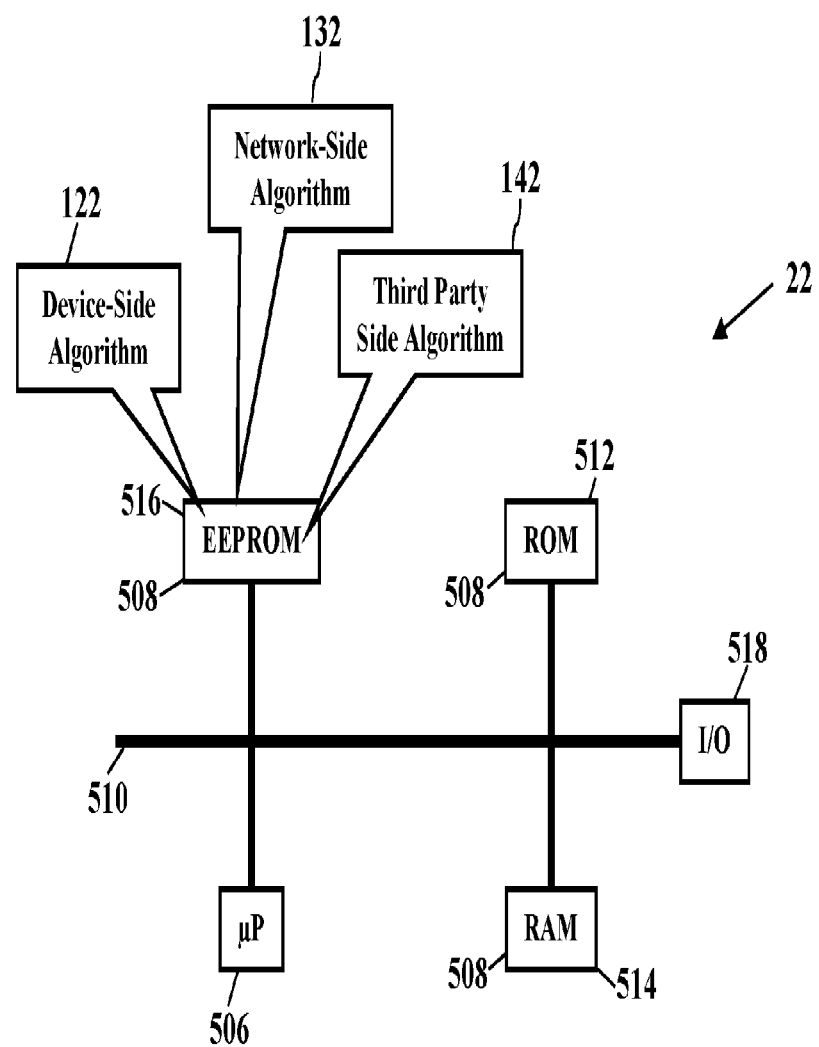
Figure 26:
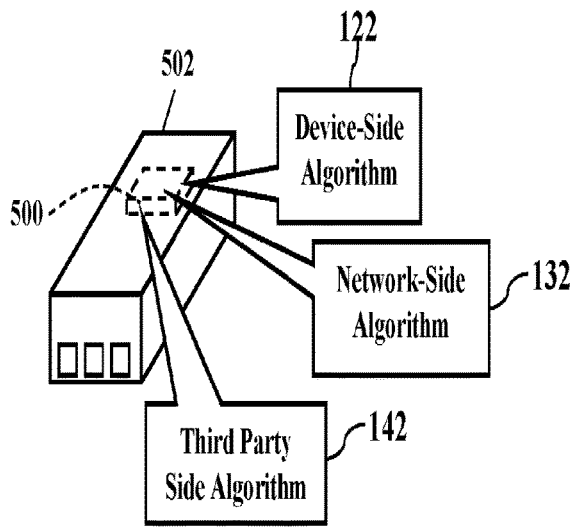
Figure 27:
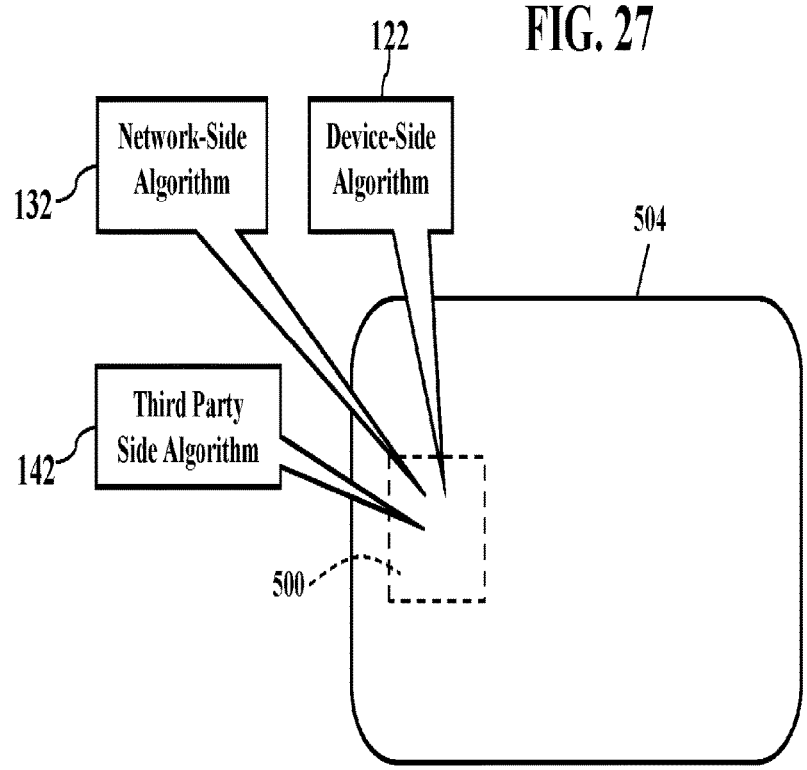

FIGS. 25-27 are schematics further illustrating the connected device 22, according to exemplary embodiments. FIG. 25 is a block diagram of a Subscriber Identity Module 500, while FIGS. 26 and 27 illustrate, respectively, the Subscriber Identity Module 500 embodied in a plug 502 and in a card 504. As those of ordinary skill in the art recognize, the Subscriber Identity Module 500 may be used in conjunction with many devices (such as the smartphone 112). The Subscriber Identity Module 500 stores user information (such as the cellular identifier 164, a user's International Mobile Subscriber Identity, the user's $K_i$ number, and other user information) and any portion of the device-side algorithm 122, the network-side algorithm 132, and/or the third party-side algorithm 142. As those of ordinary skill in the art also recognize, the plug 502 and the card 504 each may interface with any mobile or stationary device.

FIG. 25 is a block diagram of the Subscriber Identity Module 500, whether embodied as the plug 502 of FIG. 26 or as the card 504 of FIG. 27. Here the Subscriber Identity Module 500 comprises a microprocessor 506 (μP) communicating with memory modules 508 via a data bus 510. The memory modules 508 may include Read Only Memory (ROM) 512, Random Access Memory (RAM) and or flash memory 514, and Electrically Erasable-Programmable Read Only Memory (EEPROM) 516. The Subscriber Identity Module 500 stores some or all of the device-side algorithm 122, the network-side algorithm 132, and/or the third party-side algorithm 142 in one or more of the memory modules 508. FIG. 25 shows the device-side algorithm 122, the network-side algorithm 132, and/or the third party-side algorithm 142 residing in the Erasable-Programmable Read Only Memory 516, yet either module may alternatively or additionally reside in the Read Only Memory 512 and/or the Random Access/Flash Memory 514. An Input/Output module 518 handles communication between the Subscriber Identity Module 500 and the connected device 22. Because Subscriber Identity Modules are well known in the art, this patent will not further discuss the operation and the physical/memory structure of the Subscriber Identity Module 500.

Figure 28:
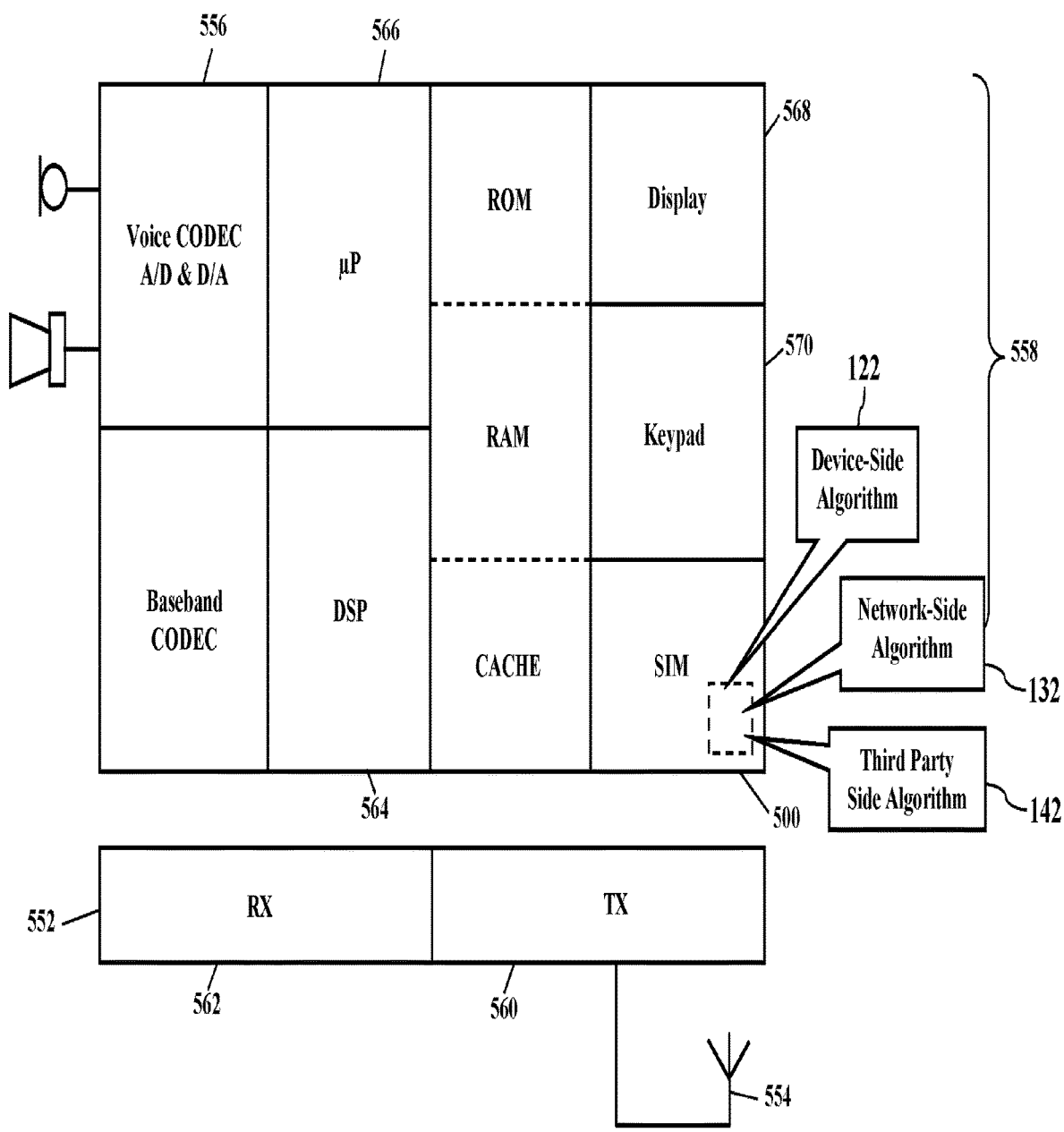

FIG. 28 is a schematic further illustrating the operating environment, according to exemplary embodiments. FIG. 28 is a block diagram illustrating more componentry of the connected device 22. The componentry may include one or more radio transceiver units 552, an antenna 554, a digital baseband chipset 556, and a man/machine interface (MMI) 558. The transceiver unit 552 includes transmitter circuitry 560 and receiver circuitry 562 for receiving and transmitting radio-frequency (RF) signals. The transceiver unit 552 couples to the antenna 554 for converting electrical current to and from electromagnetic waves. The digital baseband chipset 556 contains a digital signal processor (DSP) 564 and performs signal processing functions for audio (voice) signals and RF signals. As FIG. 28 shows, the digital baseband chipset 556 may also include an on-board microprocessor 566 that interacts with the man/machine interface (MMI) 558. The man/machine interface (MMI) 558 may comprise a display device 568, a keypad 570, and the Subscriber Identity Module 500. The on-board microprocessor 566 may also interface with the Subscriber Identity Module 500 and with the device-side algorithm 122, the network-side algorithm 132, and/or the third party-side algorithm 142.

Exemplary embodiments may be applied to any signaling standard. As those of ordinary skill in the art recognize, FIGS. 25-28 may illustrate a Global System for Mobile (GSM) communications device. That is, exemplary embodiments may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable memory device or other storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for sharing the data 26, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A server, comprising:
a processing system including a processor; and
a memory that stores executable instructions that, when executed by the processing system, facilitate performance of operations, the operations comprising:
identifying a third party by querying an electronic database that electronically associates third parties to icons including an icon received by the server from a device of a user via the Internet, the server also having received electronic data from the device via the Internet;
determining that the third party that is identified is permitted access to only a subset of the electronic data without being permitted access to all of the electronic data, the subset of the electronic data being data generated during a user-selected interval of time, the subset of the electronic data excluding first location data indicative of a home location of the user, a work location of the user, or any combination thereof, and the subset of the electronic data including second location data indicative of a travel location of the user that is neither the home location nor the work location; and
in response to the third party that is identified having been determined as being permitted the access to only the subset of the electronic data, sending the subset of the electronic data to equipment of the third party.

2. The server of claim 1, wherein the operations further comprise receiving a selection of the icon.

3. The server of claim 1, wherein the operations further comprise receiving a graphical selection of the icon.

4. The server of claim 1, wherein the operations further comprise identifying a network address that is associated with the third party.

5. The server of claim 4, wherein the sending of the subset of the electronic data comprises sending the subset of the electronic data to the equipment of the third party according to the network address.

6. The server of claim 1, wherein the operations further comprise establishing a connection to a communication network.

7. The server of claim 6, wherein the sending of the subset of the electronic data comprises sending the subset of the electronic data via the connection to the communication network.

8. The server of claim 1, wherein the interval of time is a past time interval, a current time interval, or a future time interval.

9. A non-transitory machine-readable medium comprising executable instructions that, when executed by a server including a processor, facilitate performance of operations, the operations comprising:
identifying a third party according to a querying of an electronic database that electronically associates third parties to icons including an icon received by the server from a device of a user via the Internet, the server also having received electronic data from the device via the Internet;
determining that the third party that is identified is permitted access to only a subset of the electronic data without being permitted access to all of the electronic data, the subset of the electronic data being data generated during a user-selected interval of time, the subset of the electronic data excluding first location data indicative of a home location of the user, a work location of the user, or any combination thereof, and the subset of the electronic data including second location data indicative of a travel location of the user that is neither the home location nor the work location; and
sending the subset of the electronic data to equipment of the third party.

10. The non-transitory machine-readable medium of claim 9, wherein the sending of the subset of the electronic data to the equipment of the third party comprises sending the subset of the electronic data to the equipment of the third party in response to the third party that is identified having been determined as being permitted the access to the subset of the electronic data.

11. The non-transitory machine-readable medium of claim 9, wherein the operations further comprise receiving a selection of the icon.

12. The non-transitory machine-readable medium of claim 9, wherein the operations further comprise receiving a graphical selection of the icon.

13. The non-transitory machine-readable medium of claim 9, wherein the operations further comprise identifying a network address that is associated with the third party.

14. The non-transitory machine-readable medium of claim 13, wherein the sending of the subset of the electronic data comprises sending the subset of the electronic data to the equipment of the third party according to the network address.

15. The non-transitory machine-readable medium of claim 9, wherein the operations further comprise establishing a connection to a communication network.

16. The non-transitory machine-readable medium of claim 15, wherein the sending of the subset of the electronic data comprises sending the subset of the electronic data via the connection to the communication network.

17. A method, comprising:
identifying, by a server including a processor, a third party according to a querying of an electronic database that electronically associates third parties to icons including an icon received by the server from a device of a user via the Internet, the server also having received electronic data from the device via the Internet;
determining, by the server, that the third party that is identified is permitted access to only a subset of the electronic data without being permitted access to all of the electronic data, the subset of the electronic data being data generated during a user-selected interval of time, the subset of the electronic data excluding first location data indicative of a home location of the user, a work location of the user, or any combination thereof, and the subset of the electronic data including second location data indicative of a travel location of the user that is neither the home location nor the work location;
identifying, by the server, a network address that is associated with the third party; and
in response to the third party that is identified having been determined as being permitted the access to only the subset of the electronic data, sending, by the server, the subset of the electronic data to equipment of the third party according to the network address.

18. The method of claim 17, further comprising receiving, by the server, a graphical selection of the icon.

19. The method of claim 17, further comprising establishing, by the server, a connection to a communication network.

20. The method of claim 19, wherein the sending of the subset of the electronic data comprises sending, by the server, the subset of the electronic data via the connection to the communication network.

* * * * *